(12) United States Patent
Iwai

(10) Patent No.: US 10,474,972 B2
(45) Date of Patent: Nov. 12, 2019

(54) FACILITY MANAGEMENT ASSISTANCE DEVICE, FACILITY MANAGEMENT ASSISTANCE SYSTEM, AND FACILITY MANAGEMENT ASSISTANCE METHOD FOR PERFORMANCE ANALYSIS BASED ON REVIEW OF CAPTURED IMAGES

(71) Applicant: PANASONIC INTELLECTUAL PROPERTY MANAGEMENT CO., LTD., Osaka (JP)

(72) Inventor: Kazuhiko Iwai, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 211 days.

(21) Appl. No.: 15/520,631

(22) PCT Filed: Jul. 22, 2015

(86) PCT No.: PCT/JP2015/003664
§ 371 (c)(1),
(2) Date: Apr. 20, 2017

(87) PCT Pub. No.: WO2016/067494
PCT Pub. Date: May 6, 2016

(65) Prior Publication Data
US 2017/0308843 A1    Oct. 26, 2017

(30) Foreign Application Priority Data
Oct. 28, 2014 (JP) .................................. 2014-219605

(51) Int. Cl.
*G08B 13/196* (2006.01)
*H04N 7/18* (2006.01)
(Continued)

(52) U.S. Cl.
CPC ..... *G06Q 10/063114* (2013.01); *G06Q 10/06* (2013.01); *G06Q 10/06315* (2013.01);
(Continued)

(58) Field of Classification Search
CPC .. G06Q 10/087; G06Q 30/0643; G06Q 30/00; G06Q 10/0639; G06Q 20/203; G06Q 30/0201; G06Q 30/02
See application file for complete search history.

(56) References Cited

U.S. PATENT DOCUMENTS 5,138,638 A * 8/1992 Frey ...................... G06Q 10/06
377/6
5,287,266 A * 2/1994 Malec ................... B62B 3/1408
705/323

(Continued)

FOREIGN PATENT DOCUMENTS

JP    2002-279160    9/2002
JP    2002-366621    12/2002

OTHER PUBLICATIONS

Trax image recognition web pages Traxretail.com, Sep. 27, 2015, Retrieved from Archive.org Jan. 8, 2019 (Year: 2015).*

(Continued)

*Primary Examiner* — Scott L Jarrett
(74) *Attorney, Agent, or Firm* — Greenblum & Bernstein, P.L.C.

(57) ABSTRACT

A facility management assistance device includes an image extractor that extracts an image of a target area from an image of the interior of the facility, an image presenter that presents the image of the target area to a first user, an individual evaluation information acquirer that acquires individual evaluation information on an evaluation result of the target area, in response to an input by the first user, an evaluation aggregation information generator that aggregates the individual evaluation information in a designated (Continued)

period, and generates evaluation aggregation information for listing an evaluation result for the designated period, an evaluation aggregation information presenter that presents the evaluation aggregation information to a second user, an improvement implementation information acquirer that acquires improvement implementation information on the implementation situation of an improvement measure, in response to an input by a second user, and an improvement implementation information presenter that presents the improvement implementation information to the first user.

11 Claims, 19 Drawing Sheets

(51) Int. Cl.
  *G06Q 10/08*      (2012.01)
  *G06Q 10/06*      (2012.01)
  *G06Q 10/10*      (2012.01)
(52) U.S. Cl.
  CPC ......... *G06Q 10/087* (2013.01); *G06Q 10/103* (2013.01); *G08B 13/19645* (2013.01); *H04N 7/181* (2013.01)

(56) References Cited

U.S. PATENT DOCUMENTS

| | | | | |
|---|---|---|---|---|
| 5,305,390 | A * | 4/1994 | Frey | G06Q 10/06 382/115 |
| 5,315,093 | A * | 5/1994 | Stewart | G06K 17/0022 235/375 |
| 5,557,513 | A * | 9/1996 | Frey | G06Q 10/0631 705/7.12 |
| 5,572,653 | A * | 11/1996 | DeTemple | G06K 17/0022 235/383 |
| 5,867,823 | A * | 2/1999 | Richardson | G06Q 10/06311 705/7.13 |
| 6,643,626 | B1 * | 11/2003 | Perri de Resende | G06Q 20/20 705/16 |
| 6,970,810 | B1 * | 11/2005 | Matsko | G06Q 10/06 702/187 |
| 7,093,748 | B1 * | 8/2006 | Matsko | G06Q 10/0639 235/377 |
| 7,440,903 | B2 * | 10/2008 | Riley | G06Q 10/0631 705/1.1 |
| 7,483,842 | B1 * | 1/2009 | Fung | G06Q 30/02 705/7.14 |
| 7,944,358 | B2 * | 5/2011 | Sorensen | G07C 9/00 340/539.13 |
| 8,049,621 | B1 * | 11/2011 | Egan | G06Q 10/087 235/375 |
| 8,321,303 | B1 * | 11/2012 | Krishnamurthy | 705/28 |
| 8,502,869 | B1 * | 8/2013 | Fuhr | G06Q 30/0201 348/150 |
| 2002/0161651 | A1 * | 10/2002 | Godsey | G06Q 20/202 705/22 |
| 2003/0088832 | A1 * | 5/2003 | Agostinelli | G06Q 30/02 715/273 |
| 2003/0097302 | A1 * | 5/2003 | Overhultz | G06Q 10/02 705/14.68 |
| 2003/0208468 | A1 * | 11/2003 | McNab | G06Q 10/10 |
| 2003/0227384 | A1 * | 12/2003 | Sweeney | G08B 13/246 340/540 |
| 2005/0080658 | A1 * | 4/2005 | Kohn | G06Q 10/04 705/7.14 |
| 2006/0095317 | A1 * | 5/2006 | Brown | G06Q 10/06 705/7.13 |
| 2006/0200378 | A1 * | 9/2006 | Sorensen | G06Q 10/063 705/7.29 |
| 2008/0159634 | A1 * | 7/2008 | Sharma | G06K 9/00771 382/224 |
| 2008/0294475 | A1 * | 11/2008 | Zenor | G06Q 30/02 705/7.31 |
| 2009/0059270 | A1 * | 3/2009 | Opalach | G06K 9/00 358/1.15 |
| 2009/0060349 | A1 * | 3/2009 | Linaker | G06K 9/00664 382/209 |
| 2009/0063307 | A1 * | 3/2009 | Groenovelt | G06Q 10/087 705/28 |
| 2010/0013931 | A1 * | 1/2010 | Golan | G06K 9/00771 348/150 |
| 2010/0138281 | A1 * | 6/2010 | Zhang | G06Q 10/087 705/28 |
| 2011/0011936 | A1 * | 1/2011 | Morandi | G06K 9/00 235/454 |
| 2012/0281095 | A1 * | 11/2012 | Trenciansky | G06Q 10/00 348/159 |
| 2012/0323620 | A1 * | 12/2012 | Hofman | G06Q 10/06 705/7.11 |
| 2014/0039950 | A1 * | 2/2014 | Appel | G06Q 30/02 705/7.11 |
| 2014/0211017 | A1 * | 7/2014 | Argue | H04N 7/18 348/150 |
| 2015/0120392 | A1 * | 4/2015 | Gharachorloo | G06Q 10/0639 705/7.34 |
| 2015/0187088 | A1 | 7/2015 | Iwai et al. | |
| 2015/0262116 | A1 * | 9/2015 | Katircioglu | G06Q 10/087 705/28 |
| 2016/0012379 | A1 | 1/2016 | Iwai | |
| 2016/0155011 | A1 * | 6/2016 | Sulc | G06T 7/73 382/103 |
| 2016/0162910 | A1 * | 6/2016 | Pradhan | G06Q 30/0201 705/7.23 |
| 2016/0224857 | A1 * | 8/2016 | Zhang | G06K 9/00771 |
| 2016/0335590 | A1 * | 11/2016 | Hassan | G06Q 10/087 |
| 2016/0371634 | A1 * | 12/2016 | Kumar | G06Q 10/087 |
| 2017/0178060 | A1 * | 6/2017 | Schwartz | G06K 9/4604 |
| 2017/0178227 | A1 * | 6/2017 | Graham | G06Q 30/0643 |

OTHER PUBLICATIONS

AdvancedInterfacens.com Web Pages Advanced Interfaces, Apr. 2004, Retrieved from Archive.org Jan. 18, 2011 (Year: 2004).*
Casio Soft product web pages Casiosoft.com, Casio Soft, Inc., Mar. 2000, Retrieved from Archive.org Dec. 2, 2005 (Year: 2000).*
Discovery Channels Discovers Opportunities with Accurate Traffic Data Stores.org, Dec. 2002 (Year: 2002).*
Envirosell web pages Envirosell.com, Mar. 2001, Retrieved from Archive.org Dec. 2008 (Year: 2001).*
Gaynor, Mark, Hidden Cameras Reveal Human Side of P-O-P Story P-O-P Times, 1999 (Year: 1999).*
Trax image recognition—Changing the face of in-store consumer experiences Trax, 2014 (Year: 2014).*
Missed Sales/Out-of-Stock Calculator Hardware Retailing, Apr. 16, 2016, Retrieved from Archive.org Jan. 2019 (Year: 2016).*
Trax image recognition—Next Gen Store Execution Trax Image Recognition, Jun. 2016 (Year: 2016).*
Tracking Shoppers Through the Combination Store Progressive Grocer, vol. 67, No. 7, Jul. 1988 (Year: 1988).*
Lam, Shun Yin, Uncovering the Multiple Impacts of Retail Promotion on Apparel Store Performance Richard Ivey School of Business, 1998 (Year: 1998).*
ShopperTrak web pages ShopperTrak.com, 2003, Retrieved from Archive.org Jun. 2010 (Year: 2003).*
Transaction Counts vs. Traffic Counts Headcounts.com/counts, Oct. 6, 2014, Retrieved from Archive.org Jan. 2019 (Year: 2014).*
Senior, A.W. et al., Video analytics fro retail IEEE, 2007 (Year: 2007).*
Ryski, Mark, Why Retail Customers Count Authorhouse, 2011 (Year: 2011).*
IPSOS Retail Performance: Measure, Manage, Improve Ipsos Retail Performance Ltd., 2012 (Year: 2012).*

(56) References Cited

OTHER PUBLICATIONS

International Search Report (ISR) from International Searching Authority (Japan Patent Office) in International Pat. Appl. No. PCT/JP2015/003664, dated Oct. 27, 2015.

* cited by examiner

FACILITY MANAGEMENT ASSISTANCE DEVICE, FACILITY MANAGEMENT ASSISTANCE SYSTEM, AND FACILITY MANAGEMENT ASSISTANCE METHOD FOR PERFORMANCE ANALYSIS BASED ON REVIEW OF CAPTURED IMAGES

TECHNICAL FIELD

The present disclosure relates to a facility management assistance device, a facility management assistance system, and a facility management assistance method, which assist a work of a user who manages a facility that provides products or services to the user.

BACKGROUND ART

In a store management system having a large number of chain stores in a group as a convenience store, a supervisor belonging to a head office which controls a plurality of stores recognizes the situation in the store and makes guidance and suggestions to a store manager, while traveling around the store, but in recent years, since there are so many stores managed by the supervisor with the scale-up of the store management system and there are variations in the situation in each store, a technique that enables the supervisor to efficiently perform a work for recognizing the situation in each store is desired.

As related to the work performed by such a supervisor, in the related art, a technique has been known in which a monitoring camera and a microphone are provided in a store, and information on the products in the store and the situation of a store clerk is generated based on the image by the monitoring camera and the sound by the microphone, and the information is transmitted to a terminal in the head office (See PTL 1). In the technique, since it is possible to acquire information useful for providing appropriate guidance to the store manager while the supervisor stays in the head office, the burden on the supervisor can be greatly reduced, and the variation in guidance contents due to a difference in the personal abilities of the supervisors can be suppressed.

CITATION LIST

Patent Literature

PTL 1: Japanese Patent Unexamined Publication No. 2002-366621

SUMMARY OF THE INVENTION

The supervisor evaluates whether or not there is a deficiency in the situation in the store, and in the case having deficiency, the supervisor gives an instruction to a store manager and the store manager implements a necessary improvement measures according to the guidance of the supervisor, but it is desirable that at this time, information on the evaluation on the store and information on the improvement measure performed in the store according to the evaluation are shared between the supervisor and the store manager. In particular, it is desirable that an improvement measure regarding urgent and very important improvement items is implemented after the supervisor and the store manager agree with each other, and the supervisor and the store manager try to communicate with each other, thereby rationally performing the store management work.

However, in the above-described related art, information on the products in the store and the situation of store clerk is unilaterally provided to the supervisor of the head office, that is, there is only one way flow of information, and thus no consideration has been given regarding the mechanism of sharing information between the supervisor and the store manager, and the supervisor and the store manager cannot communicate sufficiently, thereby not rationally performing the store management work.

The present disclosure has been proposed to solve such problems in the related art, and the main purpose thereof is to provide a facility management assistance device, a facility management assistance system, and a facility management assistance method, which are configured such that a plurality of persons concerned share information on evaluation for a facility and information on an improvement measure implemented at the facility according to the evaluation and try to communicate with each other, thereby rationally performing a facility management work.

A facility management assistance device of the present disclosure is a facility management assistance device that assists a work of a user who manages a facility that provides products or services to the user, including an image extractor that extracts an image of a target area in the facility, from a captured image of the interior of the facility, an image presenter that presents the image of the target area to a first user, an individual evaluation information acquirer that acquires individual evaluation information on an evaluation result of the target area, in response to an operation of inputting the evaluation result about the presence or absence of deficiency in the target area, by the first user who views the image of the target area, an evaluation aggregation information generator that aggregates the individual evaluation information in a designated period, and generates evaluation aggregation information for listing an evaluation result for the designated period, an evaluation aggregation information presenter that presents the evaluation aggregation information to a second user, an improvement implementation information acquirer that acquires improvement implementation information on the implementation situation of an improvement measure, in response to an operation of inputting the implementation situation of the improvement measure that has been implemented in the target area having deficiency, by the second user who views the evaluation aggregation information, and an improvement implementation information presenter that presents the improvement implementation information to the first user.

A facility management assistance system of the present disclosure is a facility management assistance system that assists a work of a user who manages a facility that provides products or services to the user, including a camera that captures the interior of the facility, and a plurality of information processing devices, in which any one of the plurality of information processing devices includes an image extractor that extracts an image of a target area in the facility, from a captured image of the interior of the facility, an image presenter that presents the image of the target area to a first user, an individual evaluation information acquirer that acquires individual evaluation information on an evaluation result of the target area, in response to an operation of inputting the evaluation result about the presence or absence of deficiency in the target area, by the first user who views the image of the target area, an evaluation aggregation information generator that aggregates the individual evaluation information in a designated period, and generates evaluation aggregation information for listing the evaluation result for the designated period, an evaluation aggregation information presenter that presents the evaluation aggregation information to a second user, an improvement implementation information acquirer that acquires improvement implementation information on the implementation situation of an improvement measure, in response to an operation of inputting the implementation situation of the improvement measure that has been implemented in the target area having deficiency, by the second user who views the evaluation aggregation information, and an improvement implementation information presenter that presents the improvement implementation information to the first user.

A facility management assistance method of the present disclosure is a facility management assistance method causing an information processing device to perform a process of assisting a work of a user who manages a facility that provides products or services to the user, including a step of extracting an image of a target area in the facility, from a captured image of the interior of the facility, a step of presenting the image of the target area to a first user, a step of acquiring individual evaluation information on an evaluation result of the target area, in response to an operation of inputting the evaluation result about the presence or absence of deficiency in the target area, by the first user who views the image of the target area, a step of aggregating the individual evaluation information in a designated period, and generating evaluation aggregation information for listing the evaluation result for the designated period, a step of presenting the evaluation aggregation information to a second user, a step of acquiring improvement implementation information on the implementation situation of an improvement measure, in response to an operation of inputting the implementation situation of the improvement measure that has been implemented in the target area having deficiency, by the second user who views the evaluation aggregation information, and a step of presenting the improvement implementation information to the first user.

According to the present disclosure, the first user and the second user share information on evaluation for a facility and information on an improvement measure implemented at the facility according to the evaluation and try to communicate with each other, thereby rationally performing a facility management work.

DESCRIPTION OF EMBODIMENTS

Figure 1:
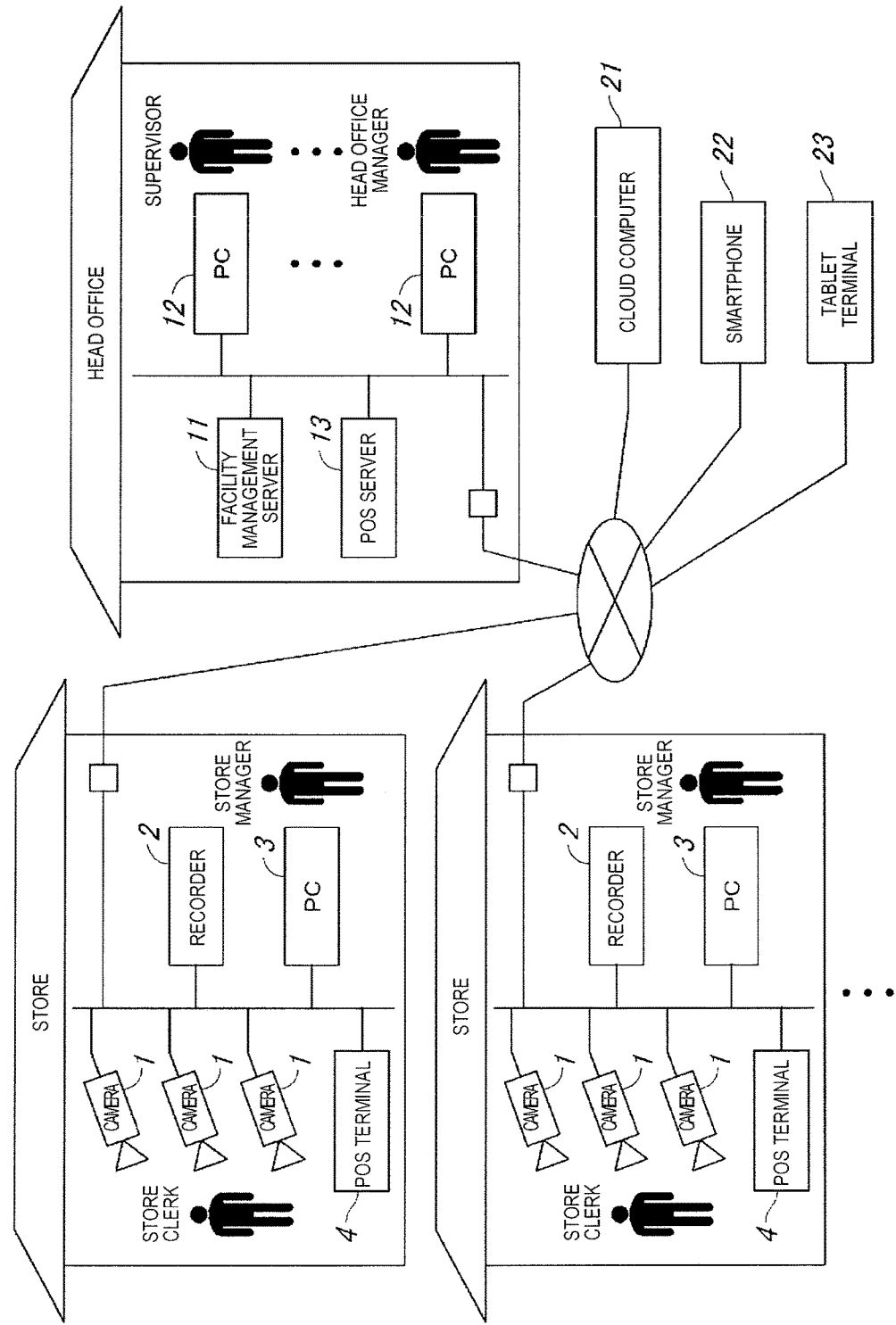
FIG. 1 is an overall configuration diagram of a facility management assistance system according to a present exemplary embodiment.

A first disclosure is a facility management assistance device that assists a work of a user who manages a facility that provides products or services to the user, including an image extractor that extracts an image of a target area in the facility, from a captured image of the interior of the facility, an image presenter that presents the image of the target area to a first user, an individual evaluation information acquirer that acquires individual evaluation information on an evaluation result of the target area, in response to an operation of inputting the evaluation result about the presence or absence of deficiency in the target area, by the first user who views the image of the target area, an evaluation aggregation information generator that aggregates the individual evaluation information in a designated period, and generates evaluation aggregation information for listing an evaluation result for the designated period, an evaluation aggregation information presenter that presents the evaluation aggregation information to a second user, an improvement implementation information acquirer that acquires improvement implementation information on the implementation situation of an improvement measure, in response to an operation of inputting the implementation situation of the improvement measure that has been implemented in the target area having deficiency, by the second user who views the evaluation aggregation information, and an improvement implementation information presenter that presents the improvement implementation information to the first user.

Thus, the first user and the second user share information on evaluation for a facility and information on an improvement measure implemented at the facility according to the evaluation and try to communicate with each other, thereby rationally performing a facility management work.

A second disclosure is configured to further include a first quantity acquirer that acquires a first quantity associated with a user who is expected to supply products or services in the facility, a second quantity acquirer that acquires a second quantity associated with a user who actually receives supply of products or services in the facility, a statistical information generator that generates statistical information indicating temporal transition of the first quantity and the second quantity, and a statistical information presenter that presents the statistical information to the first user, the image extractor extracts, in response to an operation of selecting a selection point on a time axis of the statistical information by the first user who views the statistical information, an image of the target area corresponding to the selected selection point.

Thus, the first user can recognize the situation of an opportunity loss at the facility, from the statistical information. The first user can specifically check the situation of an opportunity loss, from the image of the target area. The image of the selection point considered to be problematic due to the statistical information is quickly displayed, and while the statistical information and the image are compared, it is possible to check the situation of an opportunity loss. Therefore, the first user can recognize appropriately and quickly the situation of an opportunity loss at the facility.

In a third disclosure, an attention time zone determinator that determines the necessity of attention for each time zone, based on the first quantity and the second quantity to determine an attention time zone is further included, and the statistical information presenter preferentially displays the selection point corresponding to the attention time zone.

Thus, the image of the attention time zone is quickly displayed, thereby allowing the first user to efficiently perform a work of specifically checking the situation of an opportunity loss from the image.

A fourth disclosure is configured such that the first quantity acquirer acquires the number of customers visiting the store, as the first quantity, based on a captured image of the interior of the store which is the facility, and the second quantity acquirer acquires sales information from a sales information management device that manages the sales information, and acquires the number of customers actually purchasing products in the entire store, as the second quantity, based on the sales information.

Thus, the first user can recognize the situation of an opportunity loss in the entire store.

A fifth disclosure is configured such that the individual evaluation information acquirer acquires the individual evaluation information for each of a plurality of the first users, in response to input operations by the plurality of first users, and the evaluation aggregation information generator generates the evaluation aggregation information for listing evaluation results for the respective plurality of first users.

Thus, the second user can recognize the difference between the evaluation criteria of the respective plurality of first users, by comparing the evaluation results by the respective plurality of first users.

A sixth disclosure is configured such that the evaluation aggregation information presenter presents the evaluation result corresponding to the attention time zone so as to be distinguishable from another evaluation result.

Thus, the second user can quickly check the evaluation result corresponding to the attention time zone, that is, the time zone in which an opportunity loss is assumed to occur.

A seventh disclosure is configured such that the evaluation aggregation information presenter adds the image of the target area which is associated with the evaluation result of the target area to the evaluation aggregation information, and presents it to the second user.

Thus, since the evaluation result of the target area and the image of the target area are presented to the second user, the second user can easily and specifically recognize the evaluation content of the target area. In a case where the second user is a manager on the facility side, the second user can accurately and specifically give an instruction to the store clerk based on the image of the target area.

An eighth disclosure is a facility management assistance device that assists a work of a user who manages a facility that provides products or services to the user, and includes an image extractor that extracts an image of a target area in the facility, from a captured image of the interior of the facility an image presenter that presents the image of the target area to a first user, an improvement implementation information acquirer that acquires improvement implementation information on the implementation situation of an improvement measure, in response to an operation of inputting the implementation situation of an improvement measure that has been implemented in the target area having deficiency, by a first user who views the image of the target area, and an improvement implementation information presenter that presents the improvement implementation information to the second user.

Thus, the first user and the second user share information on an improvement measure implemented at the facility and try to communicate with each other, thereby rationally performing a facility management work.

A ninth disclosure is a facility management assistance system that assists a work of a user who manages a facility that provides products or services to the user, and includes a camera that captures the interior of the facility, and a plurality of information processing devices, in which any one of the plurality of information processing devices includes an image extractor that extracts an image of a target area in the facility, from a captured image of the interior of the facility, an image presenter that presents the image of the target area to a first user, an individual evaluation information acquirer that acquires individual evaluation information on an evaluation result of the target area, in response to an operation of inputting the evaluation result about the presence or absence of deficiency in the target area, by the first user who views the image of the target area, an evaluation aggregation information generator that aggregates the individual evaluation information in a designated period, and generates evaluation aggregation information for listing the evaluation result for the designated period, an evaluation aggregation information presenter that presents the evaluation aggregation information to a second user, an improvement implementation information acquirer that acquires improvement implementation information on the implementation situation of an improvement measure, in response to an operation of inputting the implementation situation of the improvement measure that has been implemented in the target area having deficiency, by the second user who views the evaluation aggregation information, and an improvement implementation information presenter that presents the improvement implementation information to the first user.

Thus, similar to the first disclosure, a plurality of persons concerned share information on evaluation for a facility and information on an improvement measure implemented at the facility according to the evaluation and try to communicate with each other, thereby rationally performing a facility management work.

A tenth disclosure is a facility management assistance method causing an information processing device to perform a process of assisting a work of a user who manages a facility that provides products or services to the user, and includes a step of extracting an image of a target area in the facility, from a captured image of the interior of the facility, a step of presenting the image of the target area to a first user, a step of acquiring individual evaluation information on an evaluation result of the target area, in response to an operation of inputting the evaluation result about the presence or absence of deficiency in the target area, by the first user who views the image of the target area, a step of aggregating the individual evaluation information in a designated period, and generating evaluation aggregation information for listing the evaluation result for the designated period, a step of presenting the evaluation aggregation information to a second user, a step of acquiring improvement implementation information on the implementation situation of an improvement measure, in response to an operation of inputting the implementation situation of the improvement measure that has been implemented in the target area having deficiency, by the second user who views the evaluation aggregation information, and a step of presenting the improvement implementation information to the first user.

Thus, similar to the first disclosure, a plurality of persons concerned share information on evaluation for a facility and information on an improvement measure implemented at the facility according to the evaluation and try to communicate with each other, thereby rationally performing a facility management work.

Hereinafter, embodiments of the present disclosure will be described with reference to the drawings.

(First Exemplary Embodiment)

FIG. 1 is an overall configuration diagram of a facility management assistance system according to a first exemplary embodiment. The facility management assistance system is built for retail chain stores or the like such as convenience stores, and includes camera 1, recorder (image storage device) 2, PC (user terminal) 3, and POS terminal (sales information management device) 4, which are provided for each of a plurality of stores, and facility management server (facility management assistance device) 11, PC (user terminal) 12, and POS server (sales information management device) 13, which are provided in the head office that integrally controls a plurality of stores.

Cameras 1 are provided at appropriate locations in a store to capture an interior of the store, and images obtained thereby are recorded by recorder 2. PC 3 provided in a store and PC 12 provided in the head office can display the image of the interior of the store captured by camera 1 in real time, and display the past images of the interior of the store recorded in recorder 2, and this allows a user at the store or the head office to check the situation in the store.

Facility management server 11 provided in the head office is configured as a facility management assistance device that assists the business of a user such as a store manager or a supervisor (instructor) who manages a store. Information generated by facility management server 11 can be viewed by the user on the head office side such as a supervisor and a head office manager using PC 12 provided in the head office. The information is sent to PC 3 provided in the store, and can be viewed by the user on the store side such as a store manager or a store clerk using PC 3. PCs 3 and 12 are configured as viewing devices.

POS terminal 4 is provided in the checkout counter of a store, and is operated by a store clerk to perform accounting of the product purchased by a customer. POS terminal 4 and POS server 13 provided in the head office constitute a point of sale (POS) system (sales information management system) that manages sales information regarding sales at each store. In the POS system, information such as the name, type, quantity, amount of money, and accounting time of the product purchased by the customer is managed as sales information. The sales information is shared between POS terminal 4 and POS server 13, POS terminal 4 manages sales information of the store where it is provided, and POS server 13 manages sales information of all the stores.

Figure 2A:
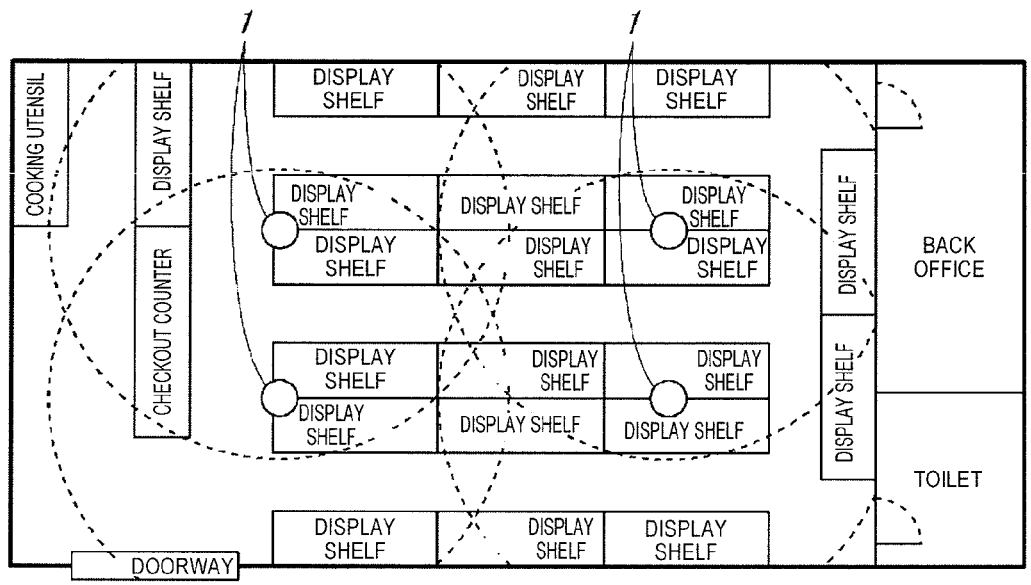
FIG. 2A is a plan view of a store illustrating a layout of the store and an installation situation of camera 1.
Figure 2B:
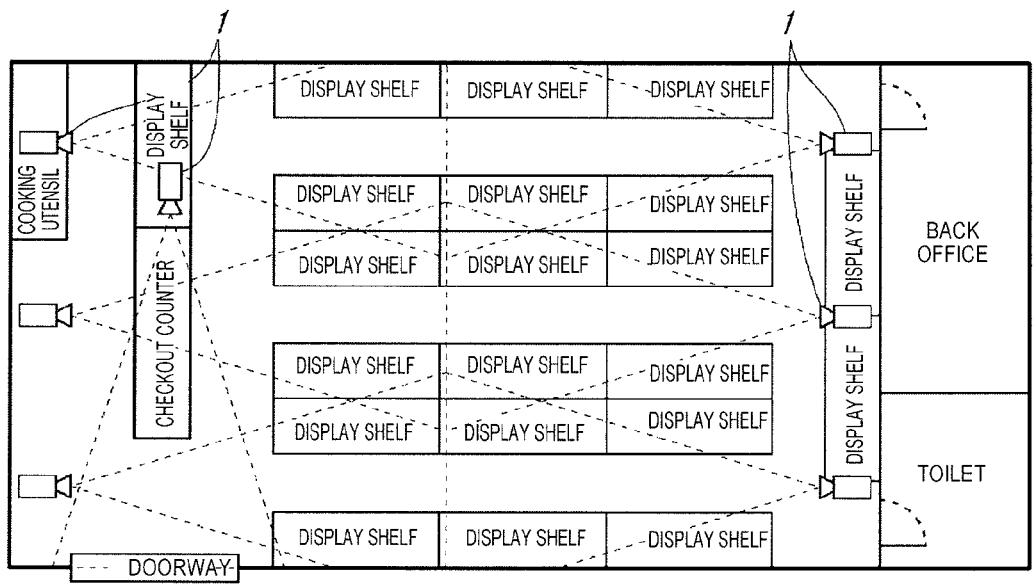
FIG. 2B is a plan view of a store illustrating a layout of the store and an installation situation of camera 1.

Next, a layout of a store and an installation situation of cameras 1 will be described. FIGS. 2A and 2B are plan views of a store illustrating a layout of the store and an installation situation of camera 1.

The store includes a doorway, display shelves, checkout counters, and cooking utensils. Display shelves are divided into product types such as lunch boxes, bakery, sweets, processed foods, desserts, drinks, and magazines. Cooking utensils are used to cook fast food such as fried chicken in the store, and display shelves for fast food are provided next to the checkout counter. A customer enters the store through the doorway, and moves in the store through passages between the display shelves. When finding a desired product, the customer goes to the checkout counter with the product, and makes payment (pays for the product) at the checkout counter before exiting the store through the doorway.

A plurality of cameras 1 which capture images of the interior of a store are provided in the store. In particular, in the example shown in FIG. 2A, omnidirectional cameras having a capture range of 360 degrees using a fish-eye lens are adopted for cameras 1. In the example shown in FIG. 2B, cameras having a predetermined angle of view, so-called box cameras, are adopted for cameras 1. These cameras 1 are provided on the ceiling of a sales floor where the display shelf and the cashier counter are provided, and can capture the entire sales floor.

Figure 3:
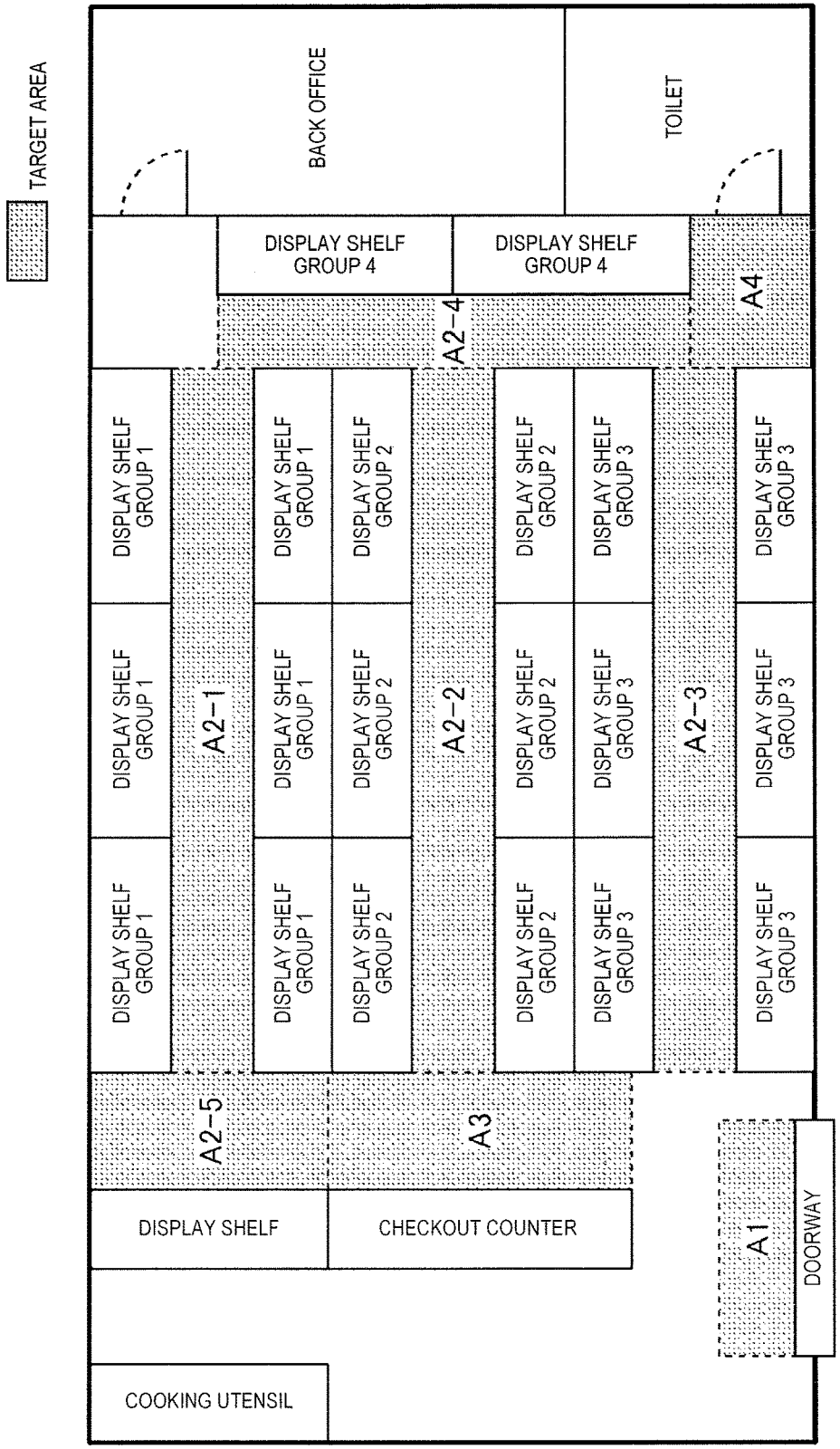
FIG. 3 is a plan view of a store illustrating target areas which are set in the store.

Next, target areas set in the store will be described. FIG. 3 is a plan view of a store showing target areas set in the store.

Target area A1 through which a customer passes when the customer enters and exits a store is set in the inside of the doorway of the store. It is possible to detect the customers who enter the store, based on the image of target area A1. In the present exemplary embodiment, the number of customers (the number of visitors) visiting the store is measured based on the detection result of the customer in target area A1.

Target areas A2-1 to A2-5 are set between the display shelves in the sales floor. Target areas A2-1 to A2-5 are sales floors which are divided for each type of products, and it is possible to detect the customers who stay in each sales floor, based on the target areas A2-1 to A2-5. In the present exemplary embodiment, the number of customers (the number of sales floor staying customers) staying at each sales floor is measured based on the detection result of the customer in target areas A2-1 to A2-5.

Target area A3 where a customer waiting for accounting stay when the customer makes an accounting is set on the sales floor side of the checkout counter. Target area A4 through which a customer passes when the customer uses toilet is set on the sales floor side of the doorway of the toilet. Thus, it is possible to detect customers who are waiting for accounting and customers who use toilets.

In the present exemplary embodiment, the image of the target area is displayed on the screen, and the supervisor or the store manager can check the display state of products on the display shelf and the implementation situation of the work of the store clerk, based on the image of the target area. Particularly, in the exemplary embodiment, the supervisor sees the image of the target area, and evaluates evaluation items such as arrangement, face-up of products on a display shelf, replenishing to replenish products on the display shelf, toilet cleaning, and customer service, for each target area (sales floor).

Figure 4:
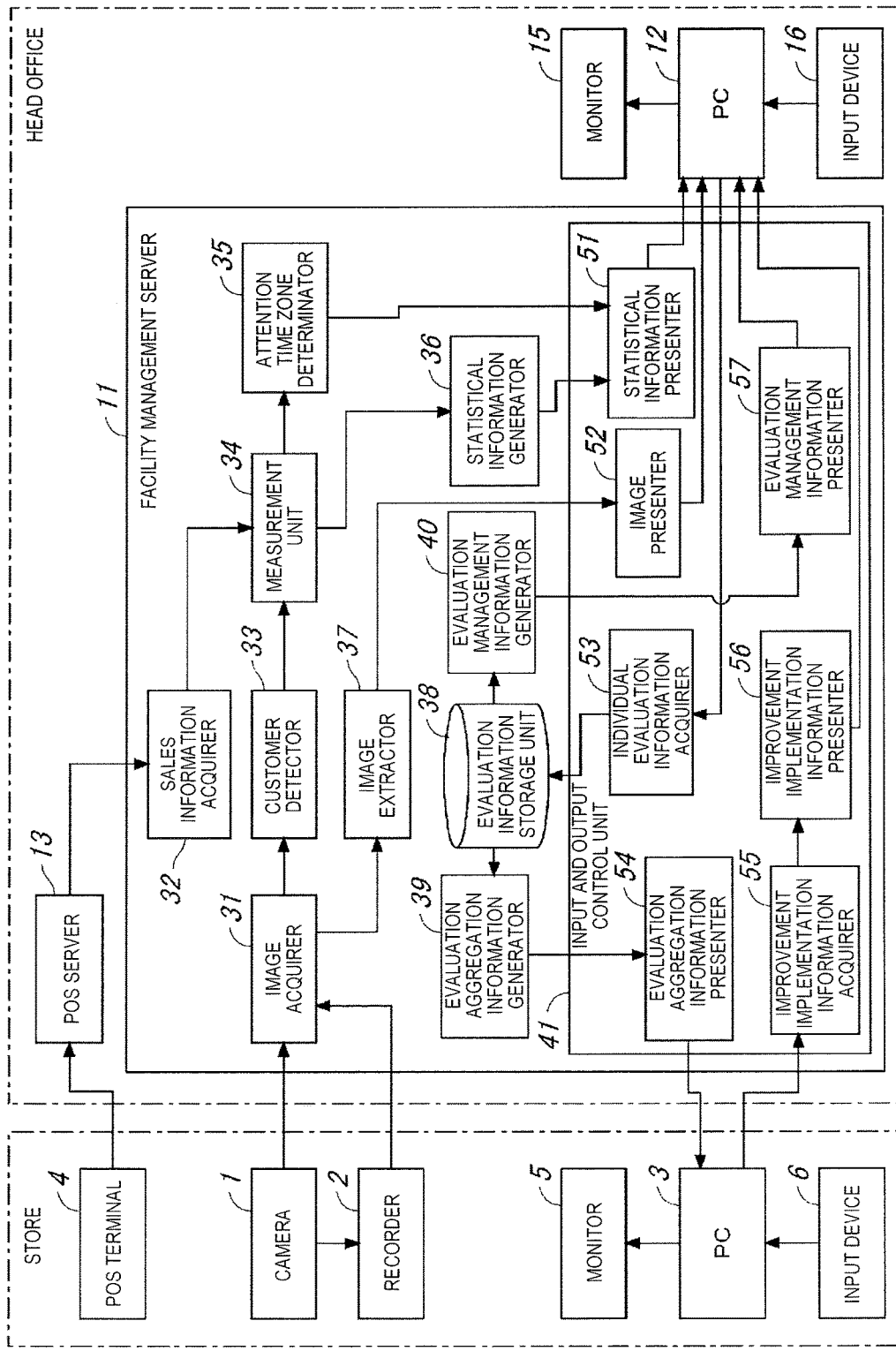
FIG. 4 is a functional block diagram illustrating a schematic configuration of facility management server 11 provided in a head office.

Next, a facility management assistance process performed by facility management server 11 provided in the head office shown in FIG. 1 will be described. FIG. 4 is a functional block diagram illustrating a schematic configuration of facility management server 11 provided in a head office.

Facility management server 11 includes image acquirer 31, sales information acquirer 32, customer detector 33, measurement unit 34, statistical information generator 36, attention time zone determinator 35, image extractor 37, evaluation information storage unit 38, evaluation aggregation information generator 39, evaluation management information generator 40, and input and output control unit 41.

Image acquirer 31 acquires captured images of the interior of a store from camera 1 and recorder 2. Here, images are acquired from camera 1 in the case of displaying the situation of the day in real time, and images are acquired from recorder 2 in the case of displaying the situation for the past predetermined period.

Sales information acquirer 32 acquires sales information from POS server 13. The sales information includes information such as an accounting time (an issue time of a receipt) of each customer, and the name, type, amount of money, and quantity of products purchased by a customer. It is also possible to acquire sales information from POS terminal 4 provided in the store.

Customer detector 33 executes a process for detecting customers entering the store from the doorway or customers staying in each sales floor, through a person detection process of detecting a person from an image acquired by image acquirer 31. The process performed by customer detector 33 will be described in detail later.

Measurement unit 34 executes a process of measuring the measurement value (the number of visitors, the number of sales floor staying customers, the number of store accounting customers, and the number of sales floor accounting customers) predetermined measurement period (for 15 minutes), based on the detection result by customer detector 33 and sales information acquired by sales information acquirer 32. The process performed by measurement unit 34 will be described in detail later.

Attention time zone determinator 35 executes a process of evaluating the necessity of attention when recognizing the situation of an opportunity loss in the store for each time zone, and determining an attention time zone, based on the measurement value acquired by measurement unit 34 (the number of visitors, the number of sales floor staying customers, the number of store accounting customers, and the number of sales floor accounting customers).

In the present exemplary embodiment, a process of acquiring the evaluation value for each time zone for the entire store, and determining whether or not it is an attention time zone for the entire store, based on the evaluation value is executed. In the present exemplary embodiment, a process is performed which acquires the evaluation value for each time zone for each sales floor, and determines whether or not it is an attention time zone for the sales floor, based on the evaluation value. The process performed by attention time zone determinator 35 will be described in detail later.

Statistical information generator 36 executes a process of aggregating the number of customers (the number of visitors, the number of sales floor staying customers, the number of store accounting customers, and the number of sales floor accounting customers) for each measurement period (for 15 minutes) acquired by measurement unit 34, for a predetermined unit period, acquiring the number of customers for each unit period, and generating statistical information indicating temporal transition of the number of customers.

In the present exemplary embodiment, it is assumed that statistical information generator 36 executes an aggregation process, with a unit period as a time zone, but the unit period may be one day, one week, or one month. In the present exemplary embodiment, it is assumed that measurement unit 34 acquires the number of customers (the number of visitors, the number of sales floor staying customers, the number of store accounting customers, and the number of sales floor accounting customers) for each measurement period, with the measurement period as 15 minutes, but the measurement period may be one hour or the like. Here, if the measurement period is one hour, an aggregation process of acquiring the number of customers for each time zone (one hour) is not required.

Input and output control unit 41 executes a process of generating display information relating to various screens and displaying screens on monitors (display devices) 15, 5 through PC 12 in the head office and PC 3 in the store, and a process of acquiring input information by an input operation performed by the user using input devices 16 and 6 such as a mouse and a key board through PC 12 in the head office and PC 3 in the store. Input and output control unit 41 may be configured as a web server exchanging information between web browsers activated by PC 12 in the head office and PC 3 in the store.

In the present exemplary embodiment, input and output control unit 41 includes statistical information presenter 51, image presenter 52, individual evaluation information acquirer 53, evaluation aggregation information presenter 54, improvement implementation information acquirer 55, improvement implementation information presenter 56, and evaluation management information presenter 57.

Statistical information presenter 51 executes a process of presenting the statistical information generated by statistical information generator 36 to the supervisor through PC 12 in the head office. Image presenter 52 executes a process of presenting the image of the interior of the store extracted by image extractor 37 to the supervisor through PC 12 in the head office. In the present exemplary embodiment, statistical information presenter 51 generates a time chart indicating temporal transition of the number of customers (the number of visitors, the number of sales floor staying customers, the number of store accounting customers, and the number of sales floor accounting customers) from the statistical information generated by statistical information generator 36, outputs display information for integrating and displaying the time chart and the image of the interior of the store, and thus the store monitoring screen (see FIG. 8), and the sales floor monitoring screen (see FIG. 10) are displayed on monitor 15.

Individual evaluation information acquirer 53 executes a process of acquiring individual evaluation information on the evaluation result for each sales floor of the store, in response to the input operation of the supervisor using input device 16. In the present exemplary embodiment, an evaluation result input screen (see FIGS. 12A. B and C) is displayed on monitor 15, and individual evaluation information is acquired in response to an input operation performed by the supervisor on the evaluation result input screen. The individual evaluation information acquired by individual evaluation information acquirer 53 is stored in evaluation information storage unit 38.

Evaluation aggregation information generator 39 executes a process of aggregating the individual evaluation information acquired by individual evaluation information acquirer 53 and stored in evaluation information storage unit 38, that is, individual evaluation information on the evaluation result performed by each supervisor, in a designated period, and generating evaluation aggregation information for listing the evaluation result for the designated period.

Evaluation aggregation information presenter 54 of input and output control unit 41 executes a process of presenting the evaluation aggregation information generated by evaluation aggregation information generator 39 to the user on the store side. In the present exemplary embodiment, as described below, an evaluation result list screen for listing the evaluation results of the respective sales floors by each supervisor (see FIG. 13, FIG. 14, and FIG. 15) is displayed on monitor 5 in a store.

Improvement implementation information acquirer 55 executes a process of acquiring improvement implementation information on the implementation situation of an improvement measure to improve deficiencies of a sales floor, in response to an input operation performed by the user on the store side using input device 6. In the present exemplary embodiment, the improvement situation input screen (see FIG. 17) is displayed on monitor 5, and improvement implementation information is acquired in response to an input operation performed by the user on the store side on the improvement situation input screen.

Improvement implementation information presenter 56 executes a process of presenting improvement implementation information acquired by improvement implementation information acquirer 55 to the supervisor through PC 12 in the head office.

Evaluation management information generator 40 executes a process of generating evaluation management information on the implementation situation of an evaluation work by each supervisor, based on the individual evaluation information acquired by individual evaluation information acquirer 53 and stored in evaluation information storage unit 38.

Evaluation management information presenter 57 executes a process of presenting the evaluation management information generated by evaluation management information generator 40 to a head office manager through PC 12 in the head office. In the present exemplary embodiment, evaluation management screen 161 indicating the implementation situation of an evaluation work by each supervisor (see FIG. 18) is displayed on monitor 15 in the head office.

In addition, input and output control unit 41 executes a process of acquiring setting information on various processing conditions, in response to an input operation performed by the user using input devices 16 and 6. In the present exemplary embodiment, for example, position information of the target area (see FIG. 3) corresponding to a sales floor is acquired. In this case, an area setting screen displaying the layout of the store may be displayed on monitors 15, 5, and the position of the target area may be input on this area setting screen.

Each unit of facility management server 11 shown in FIG. 4 is realized by the processor (CPU) of facility management server 11 executing the facility management assistance instruction (program) stored in the memory. This program may be installed in advance in facility management server 11 which is an information processing device and configured as a dedicated device, or may be provided to the user by being recorded in an appropriate program recording medium or through a network, as an application program operating on a general purpose OS.

Figure 5:
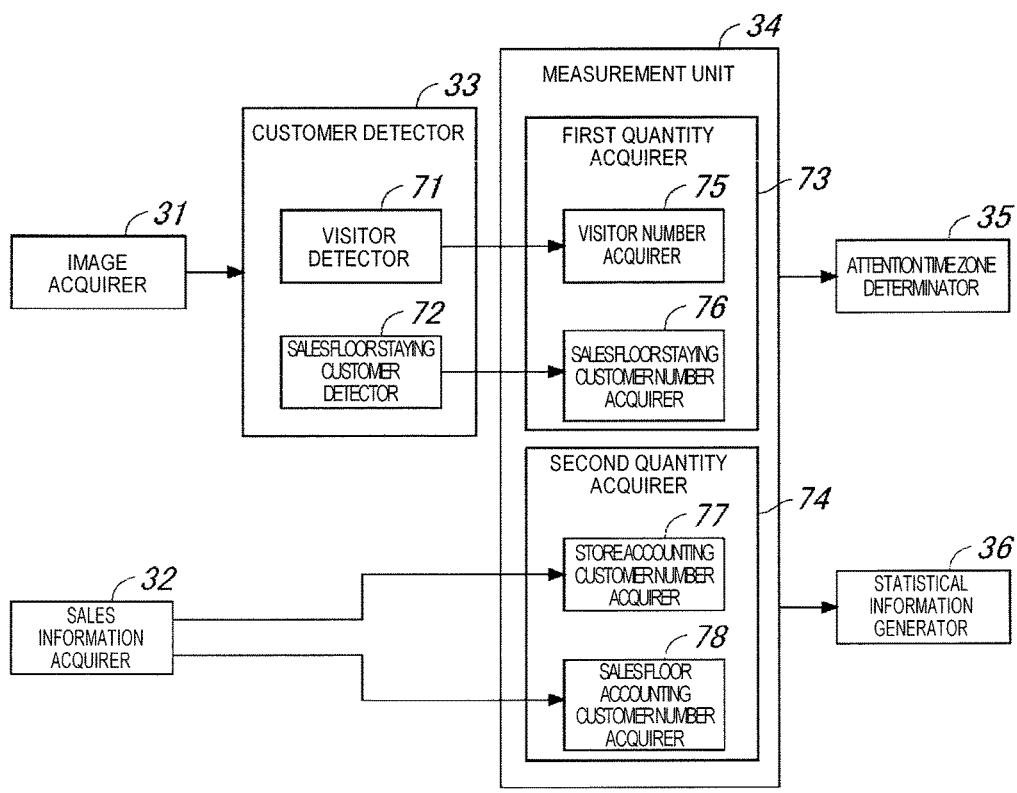
FIG. 5 is a functional block diagram illustrating schematic configurations of customer detector 33 and measurement unit 34.

Next, processes executed by customer detector 33 and measurement unit 34 illustrated in FIG. 4 will be described. FIG. 5 is a functional block diagram illustrating schematic configurations of customer detector 33 and measurement unit 34.

Customer detector 33 is used to detect customers entering the store from the doorway or customers staying in each sales floor, through a person detection process of detecting a person from an image acquired, and includes visitor detector 71, and sales floor staying customer detector 72. A known image analysis technique may be used for the process executed by customer detector 33.

Visitor detector 71 executes a process for detecting the customers entering the store from the doorway, through a person detection process of detecting a person from an image of a doorway captured by camera 1. In this process, a measurement line is set on the image of target area A1 (see FIG. 3) captured by camera 1, and a person passing through the measurement line may be detected. Visitor detector 71 acquires the visiting time of each customer, from the capture time of the image in which a customer entering the store from the doorway is detected.

Sales floor staying customer detector 72 executes a process for detecting a customer staying in each sales floor, through a person detection process of detecting a person from an image of each sales floor in the store captured by camera 1. In this process, a person existing in the target area corresponding to each sales floor continuously for a predetermined time is detected. Sales floor staying customer detector 72 acquires the sales floor staying time of each customer, from the capture time of the image in which a customer staying in each sales floor is detected.

Measurement unit 34 is used to measure the number of customers for a predetermined measurement period (for 15 minutes) based on the detection result by customer detector 33 and the sales information acquired by sales information acquirer 32, and includes first quantity acquirer 73, and second quantity acquirer 74.

First quantity acquirer 73 is used to acquire a first quantity (the number of visitors and the number of sales floor staying customers) associated with a customer who is expected to purchase a product in the entire store and each sales floor, that is, a customer visiting the store and a customer staying in the sales floor, and includes visitor number acquirer 75, and sales floor staying customer number acquirer 76.

Visitor number acquirer 75 executes a process of acquiring the number of visitors for each predetermined measurement period, that is, the number of customers visiting the store during the measurement period, based on the visiting time for each customer acquired by visitor detector 71.

Sales floor staying customer number acquirer 76 executes a process of acquiring the number of sales floor staying customers for each predetermined measurement period, that is, the number of customers staying in the sales floor for each sales floor, based on the sales floor staying time for each customer acquired by sales floor staying customer detector 72.

Second quantity acquirer 74 is used to acquire a second quantity (the number of store accounting customers and the number of sales floor accounting customers) associated with a customer who actually purchases a product in the entire store and each sales floor, and includes store accounting customer number acquirer 77, and sales floor accounting customer number acquirer 78.

Store accounting customer number acquirer 77 executes a process of acquiring the number of store accounting customers for each predetermined measurement period, that is, the number of customers who perform the accounting in the entire store during the measurement period, in other words, the number of customers who purchase some products in the store, based on the accounting time of each customer acquired by sales information acquirer 32. The number of store accounting customers is the number of receipts issued in the store.

Sales floor accounting customer number acquirer 78 executes a process of acquiring the number of sales floor accounting customers for each predetermined measurement period, that is, the number of customers who perform the accounting for products in each sales floor during the measurement period, in other words, the number of customers who purchase products in each sales floor, based on the accounting time of each customer acquired by sales information acquirer 32. Customers who purchase products in different sales floors at the same time are measured in duplicate at each sales floor.

Figure 6:
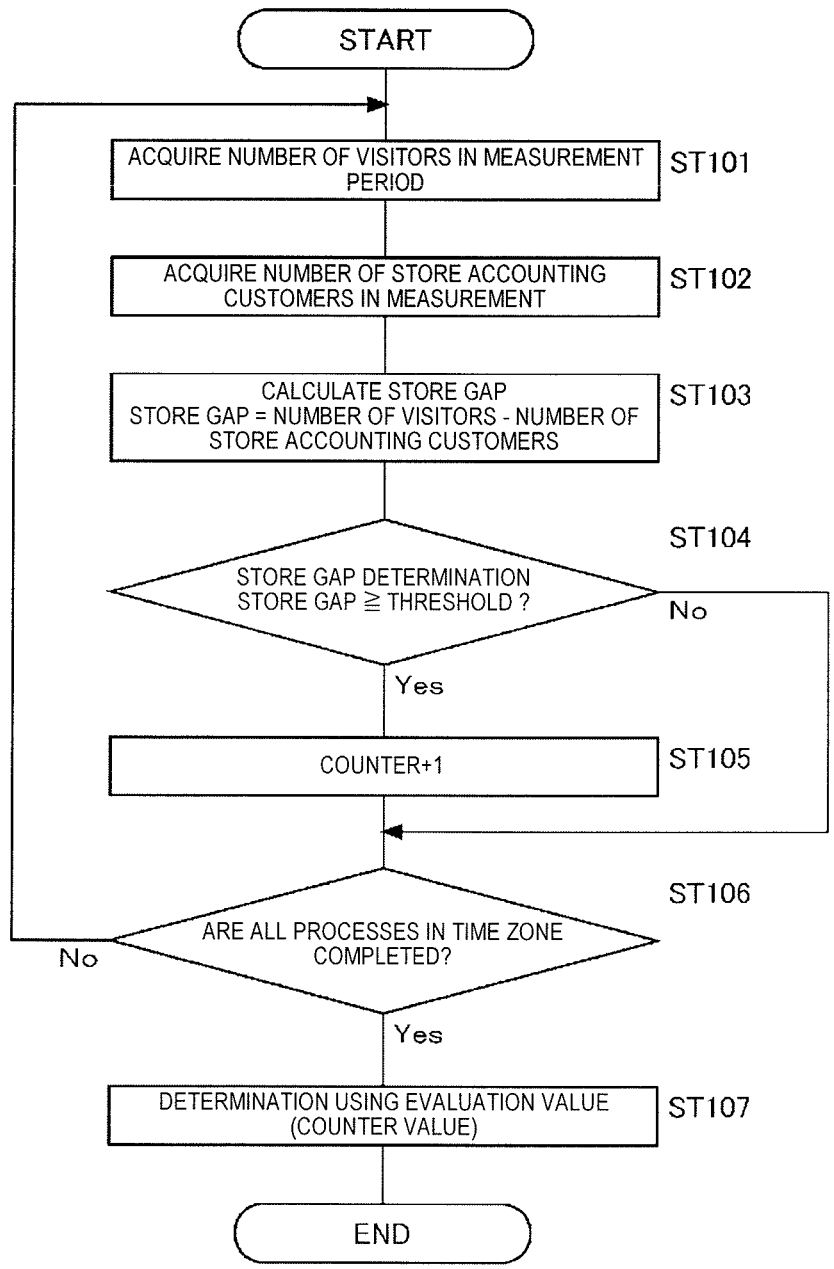
FIG. 6 is a flowchart showing a procedure of an attention time zone determination process for an entire store performed by attention time zone determinator 35.

Next, an attention time zone determination process for an entire store performed by attention time zone determinator 35 illustrated in FIG. 4 will be described. FIG. 6 is a flowchart showing a procedure of the attention time zone determination process for an entire store performed by attention time zone determinator 35.

In the present exemplary embodiment, attention time zone determinator 35 executes a process of acquiring the evaluation value for the entire store for each time zone, and determining whether or not it is an attention time zone for the entire store, using the evaluation value. In this process, a store gap determination is made as to whether or not the store gap is equal to or greater than a predetermined threshold. In the present exemplary embodiment, the store gap is a difference between the number of visitors and the number of store accounting customers, and a storage gap determination is made based on the measurement values which are respectively acquired by visitor number acquirer 75 and store accounting customer number acquirer 77, that is, the number of visitors and the number of store accounting customers.

In the example illustrated in FIG. 6, with respect to one time zone, a store gap determination is executed a plurality of times (four times) based on the measurement value (the number of visitors and the number of store accounting customers) for each measurement period (for 15 minutes) acquired by measurement unit 34, and the evaluation value of the time zone is acquired based on the result of the store gap determination for each measurement period.

Specifically, first, visitor number acquirer 75 and store accounting customer number acquirer 77 acquire the number of visitors and the number of store accounting customers in the first measurement period of one time zone (ST101, ST102). Next, attention time zone determinator 35 calculates a store gap from the number of visitors and the number of store accounting customers in the measurement period (ST103). A store gap determination is made as to whether or not the store gap is equal to or greater than a predetermined threshold (ST104). Here, if the store gap is equal to or greater than the threshold (Yes in ST104), the counter value is incremented by 1 (ST105).

Next, it is determined whether or not all the processes in one time zone have been completed (ST106). If all the processes in one time zone have not been completed (No in ST106), the process proceeds to the process of the next measurement period. On the other hand, if all the processes in one time zone have been completed (Yes in ST106), the process proceeds to the determination process as to whether it is an attention time zone (ST107).

In the determination process (ST107), a process of determining whether or not it is an attention time zone is performed using the evaluation value of the time zone, with the counter value as an evaluation value of the time zone. Specifically, the evaluation value of the time zone is compared with a predetermined threshold (for example, two) to determine whether or not it is an attention time zone. In the present exemplary embodiment, the evaluation value (counter value) is any one of 0 to 4, since a store gap determination is performed four times in one time zone (1 hour).

The above process is performed for each time zone, and the attention time zone is determined.

In the present exemplary embodiment, attention time zone determinator 35 executes a process of acquiring the evaluation value for each sales floor for each time zone, and determining whether or not it is an attention time zone for the sales floor, using the evaluation value. In this process, a sales floor gap determination is made as to whether or not the sales floor gap is equal to or greater than a predetermined threshold.

The process for the sales floor may be performed in the same procedure as in the process for the entire store shown in FIG. 6. Particularly, in the process for the sales floor, a store gap determination may be made based on the number of sales floor staying customers and the number of sales floor accounting customers which are respectively acquired by sales floor staying customer number acquirer 76 and sales floor accounting customer number acquirer 78, with the sales floor gap as a difference between the number of sales floor staying customers and the number of sales floor accounting customers. A store gap determination may be made based on the number of visitors and the number of sales floor staying customers which are respectively acquired by visitor number acquirer 75 and sales floor staying customer number acquirer 76, with the sales floor gap as a difference between the number of visitors and the number of sales floor staying customers.

Figure 7:
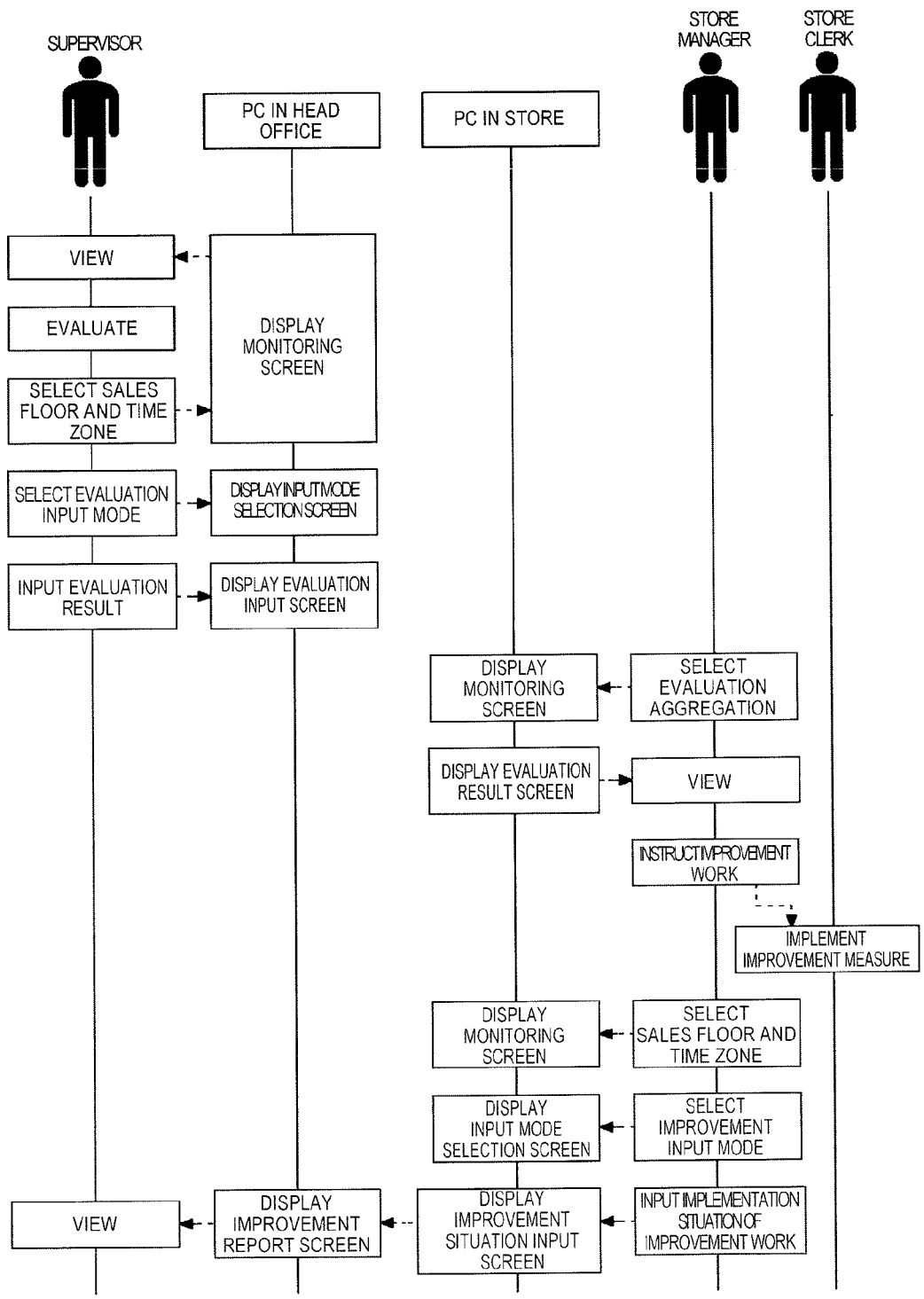
FIG. 7 is a sequence diagram showing an outline of a process executed by PC 12 in a head office and PC 3 in a store, and actions performed by a supervisor, a store manager, and a store clerk.

Next, an outline of a process executed by PC 12 in a head office and PC 3 in a store, illustrated in FIG. 4, and actions performed by a supervisor, a store manager, and a store clerk will be described. FIG. 7 is a sequence diagram showing an outline of a process executed by PC 12 in a head office and PC 3 in a store, and actions performed by a supervisor, a store manager, and a store clerk.

In the present exemplary embodiment, the supervisor evaluates each sales floor of the store that the supervisor is in charge of, and presents the evaluation result to the store manager, and the store manager views the evaluation result of the supervisor, and instructs a store clerk to perform a necessary improvement measure. If the store clerk performs the improvement measure and the deficiency is resolved, the store manager reports the implementation situation of the improvement measure to the supervisor. The supervisor views the report from the store manager, and is able to recognize that the deficiency in the store has been improved.

Specifically, first, in PC 12 of the head office, a monitoring screen (see FIG. 8 and FIG. 10) is displayed in response to the startup operation of the supervisor, and the supervisor views the image of each sales floor of the store that the supervisor is in charge of, on the monitoring screen. The supervisor recognizes the situation of the sales floor from the image of the sales floor of the store displayed on the monitoring screen, and evaluates the sales floor.

At this time, a time zone that is determined to be an attention based on the store gap and the sales floor gap is displayed on the monitoring screen, and the supervisor evaluates sales floors for the attention time zone. In addition, a work schedule is defined such that the supervisor evaluates the sales floor in the preset time zones, for example, the time zone (7 o'clock in the morning, 12 o'clock in the afternoon, and 16 o'clock in the evening) immediately before respective peak times in the morning, afternoon, and evening, and the sales floor is evaluated in the time zone defined in the work schedule.

Next, the supervisor inputs the evaluation result for each sales floor in PC 12 of the head office. At this time, if the supervisor selects a sales floor and a time zone on the monitoring screen, an input mode selection screen (see FIG. 11) is displayed. If an evaluation result input mode is selected on the input mode selection screen, an evaluation result input screen (see FIGS. 12A, B, and C) is displayed, and an evaluation result is input on the evaluation result input screen.

Next, in PC 3 in the store, a monitoring screen (see FIG. 8 and FIG. 10) is displayed in response to the startup operation of the store manager, and if the store manager selects the evaluation aggregation mode on the monitoring screen, an evaluation result list screen (see FIG. 13, FIG. 14, and FIG. 15) is displayed. The store manager views the evaluation result list screen and checks the evaluation result by the supervisor. If the store manager determines that an improvement measure is necessary from evaluation result by the supervisor, the store manager instructs the store clerk to perform the improvement measure, and the store clerk performs the improvement measure, thereby improving the deficiency in the sales floor.

Next, in PC 3 in the store, if the store manager selects a sales floor on which an improvement measure is implemented and a time immediately after the improvement measure is implemented, the input mode selection screen (see FIG. 11) is displayed. If an improvement situation and an input mode are selected on the input mode selection screen, the improvement situation input screen (see FIG. 17) is displayed, and the store manager inputs that the deficiency of the sales floor has been improved on the improvement situation input screen.

Next, an improvement report screen displaying the contents input on the improvement situation input screen on PC 3 in the store is displayed in PC 12 of the head office. The supervisor can check that the deficiency of the sales floor have been improved by the improvement report screen. Since the monitoring screen (see FIG. 8 and FIG. 10) is displayed on PC 12 in the head office, it is possible to check the situation of the sales floor with the deficiency improved from the image displayed on the monitoring screen.

Figure 8:
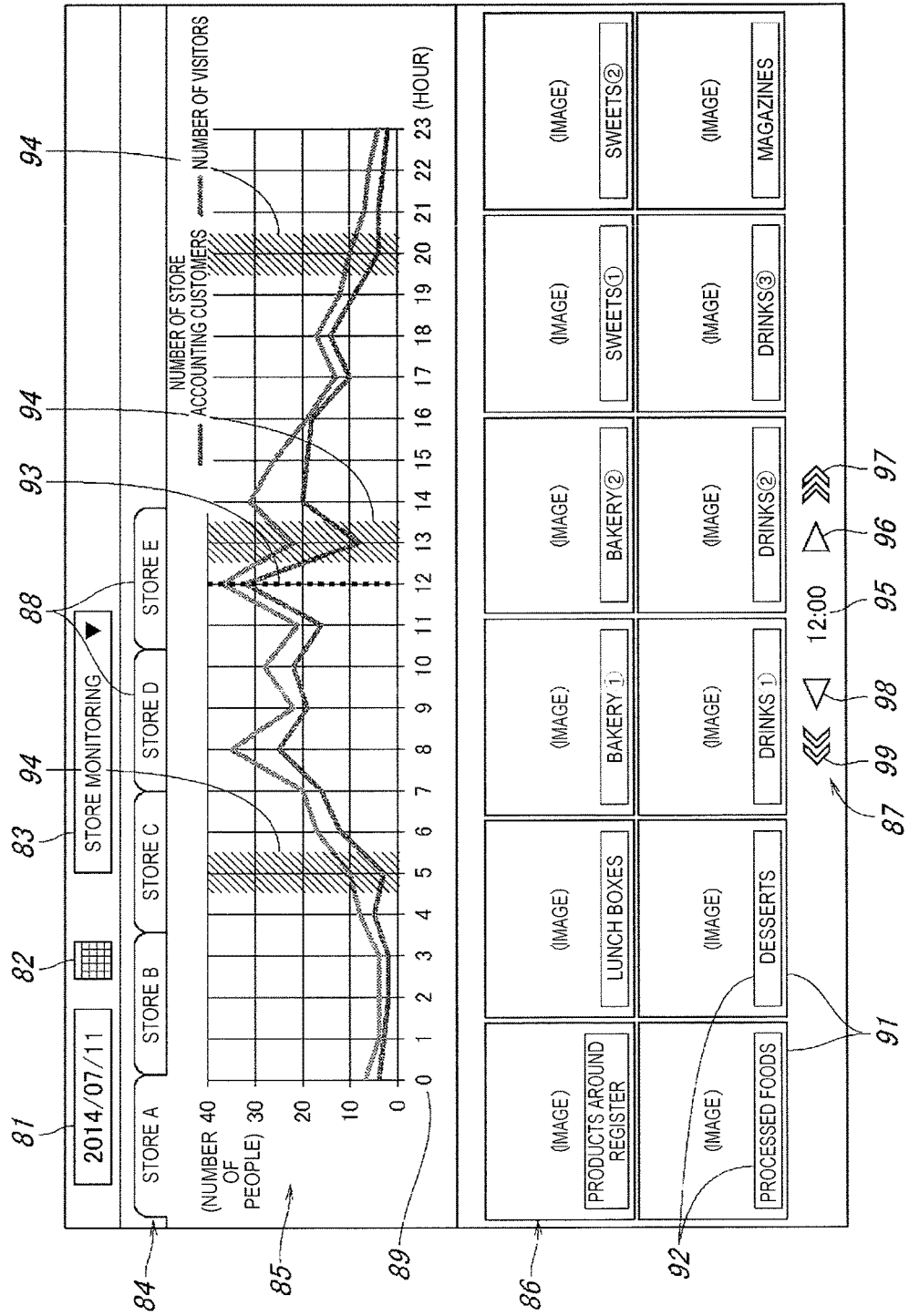
FIG. 8 is an explanatory diagram illustrating a store monitoring screen displayed on monitors 15, 5.
Figure 9:
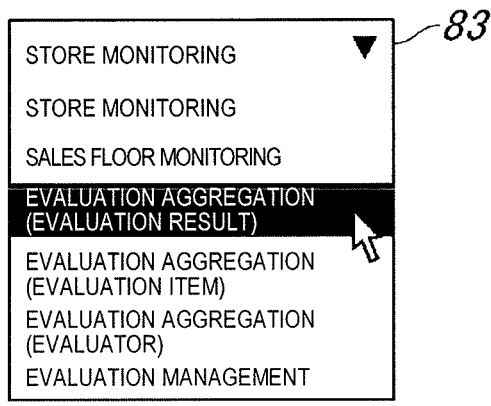
FIG. 9 is an explanatory diagram illustrating a display mode selection portion illustrated in FIG. 8.

Next, a store monitoring screen for the user to recognize the occurrence situation of an opportunity loss in the store will be described. FIG. 8 is an explanatory diagram illustrating a store monitoring screen displayed on monitors 15, 5 illustrated in FIG. 4. FIG. 9 is an explanatory diagram illustrating display mode selection portion 83 illustrated in FIG. 8. Although FIG. 8 shows the situation on the designated date in the past, it is also possible to display the today's situation in real time, and in this case the situation before the current time is displayed.

Date display portion 81, date selection portion 82, display mode selection portion 83, store selection portion 84, statistical information display portion 85, image display portion 86, and image operation unit 87 are provided on the store monitoring screen.

Date is displayed in date display portion 81. In the initial state, the date on the day when the store monitoring screen is opened is displayed. Date selection portion 82 is used for the user to select a date. If date selection portion 82 is operated, a calendar screen is displayed. If a date is selected on the calendar screen, the selected date is displayed on date display portion 81, and the statistical information and image of the date are displayed in statistical information display portion 85 and image display portion 86.

Display mode selection portion 83 is used for the user to select a display mode. In the present exemplary embodiment, as shown in FIG. 9, as a display mode, it is possible to select the display mode of any one of store monitoring, sales floor monitoring, evaluation aggregation by evaluation result, evaluation aggregation by evaluation item, evaluation aggregation by evaluator, and evaluation management.

Figure 10:
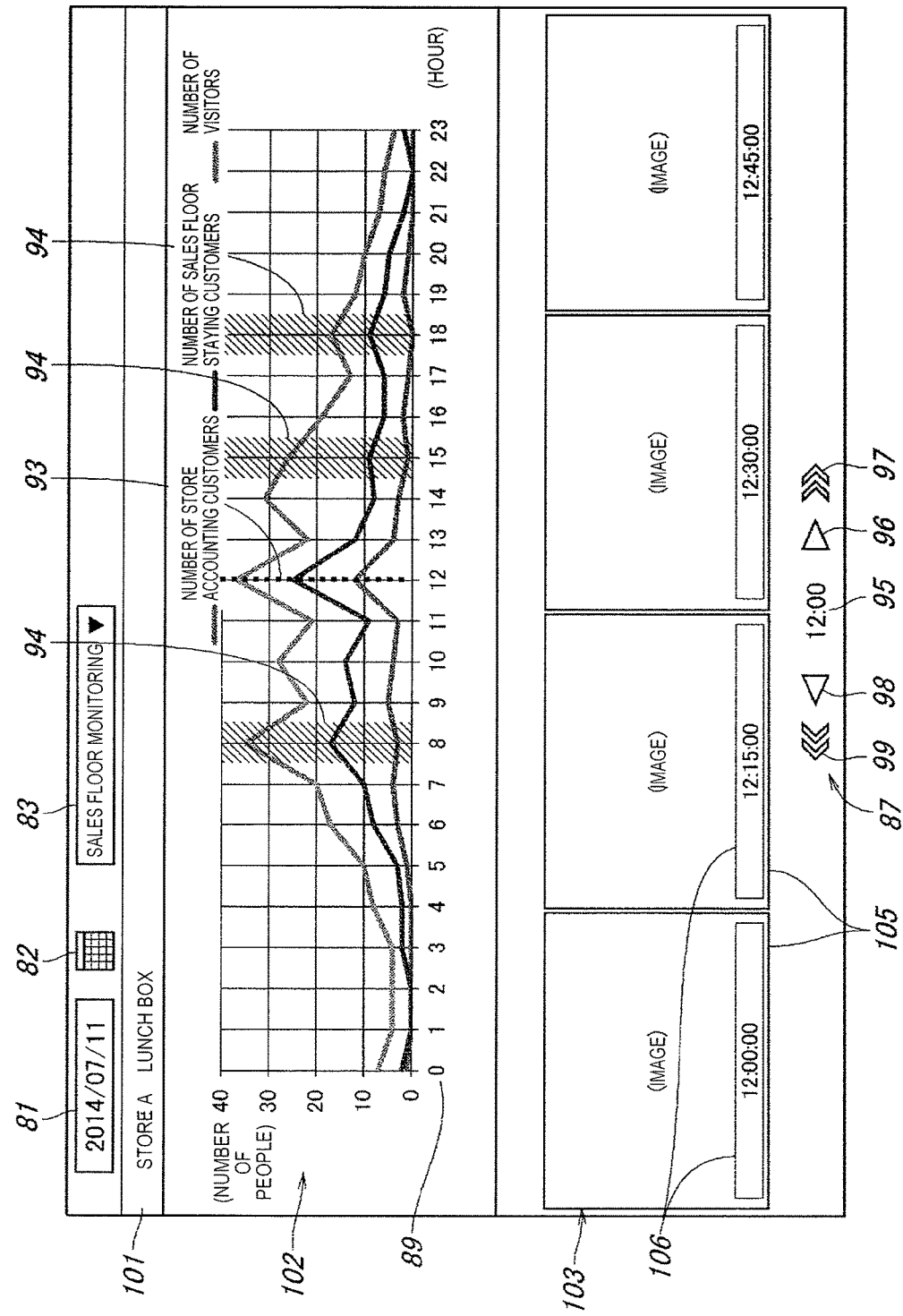
FIG. 10 is an explanatory diagram illustrating a sales floor monitoring screen displayed on monitors 15, 5.
Figure 13:
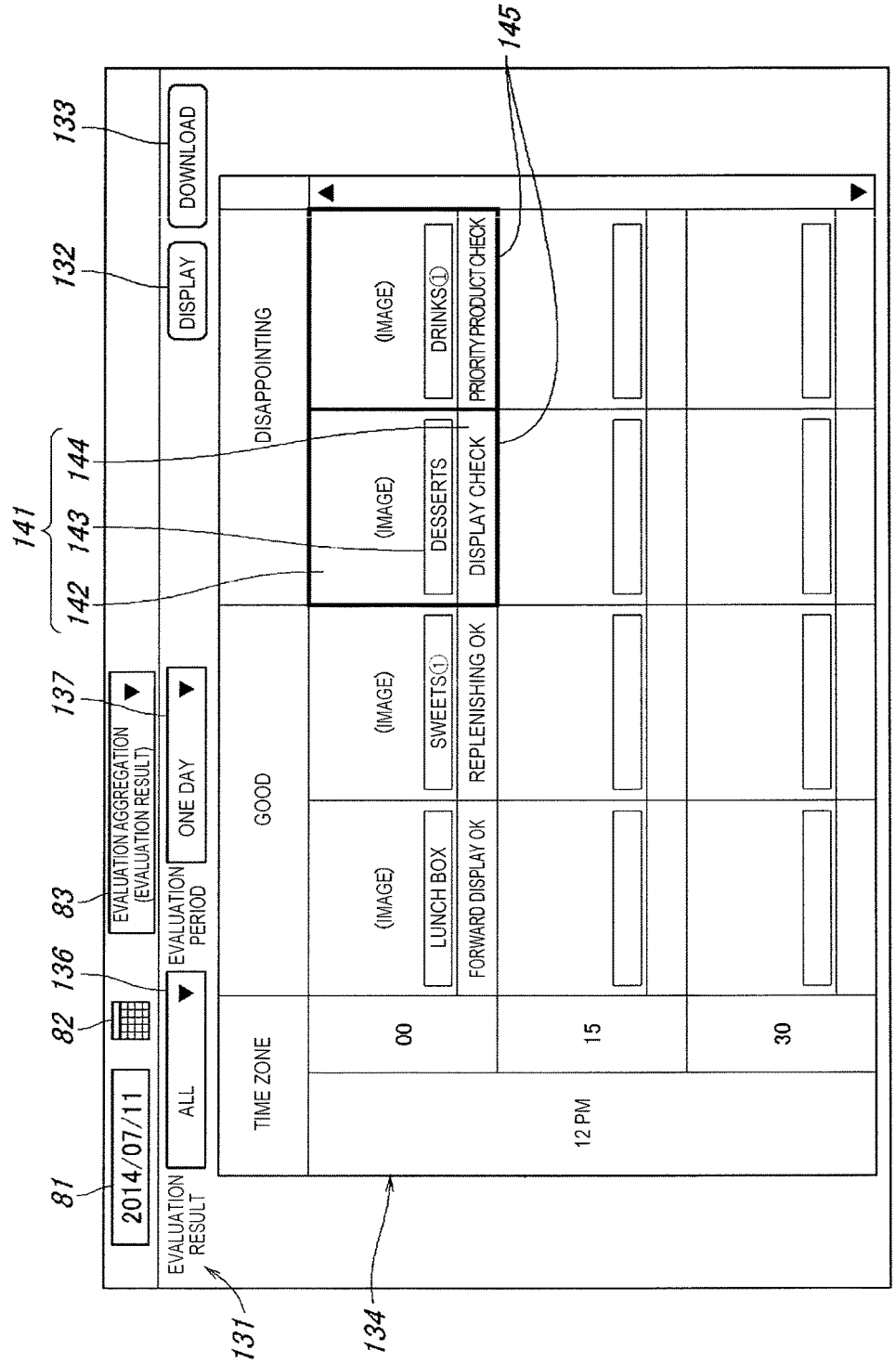
FIG. 13 is an explanatory diagram illustrating an evaluation result list screen displayed on monitor 5 of a store.
Figure 14:
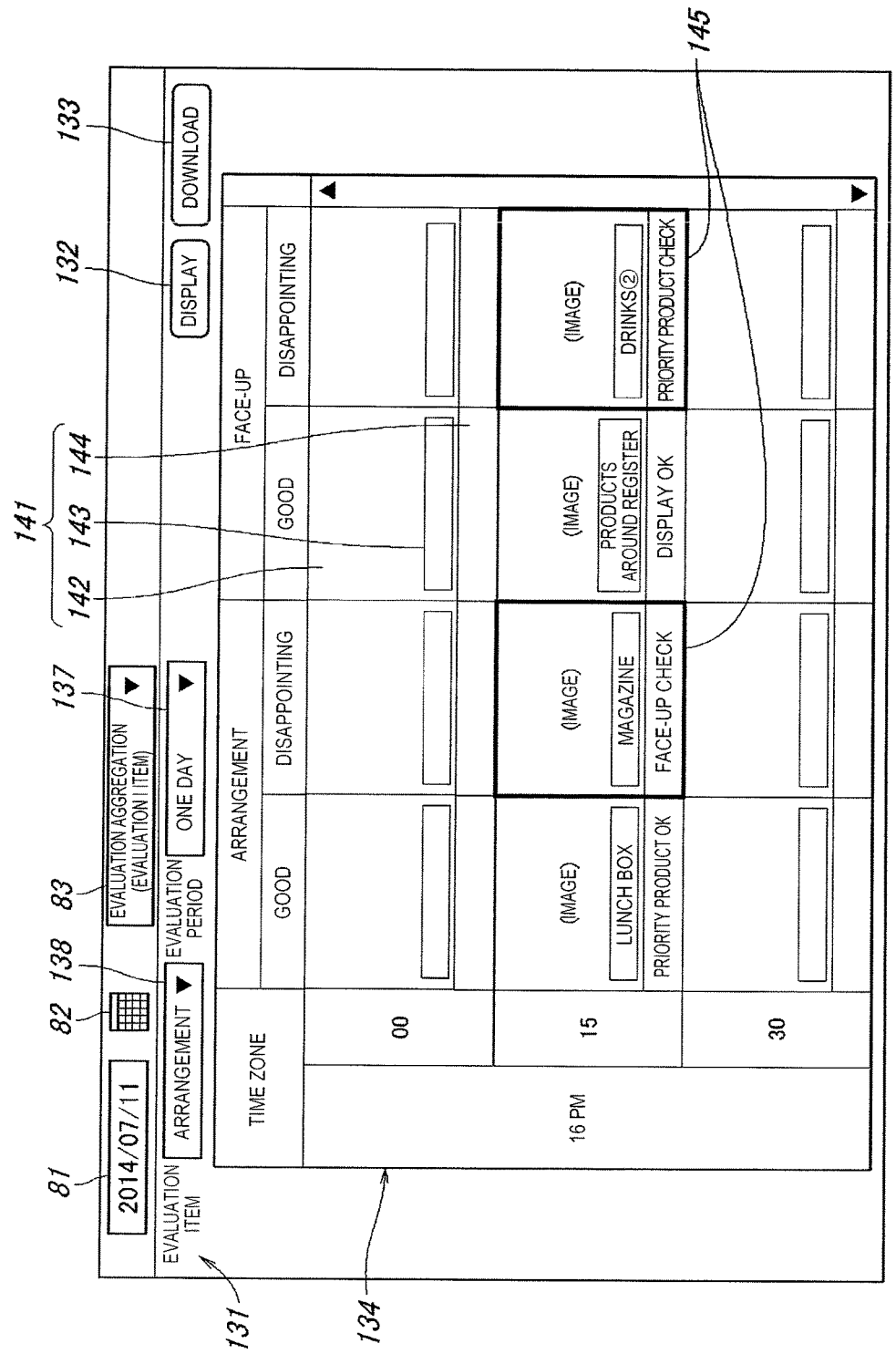
FIG. 14 is an explanatory diagram illustrating an evaluation result list screen displayed on monitor 5 of the store.
Figure 15:
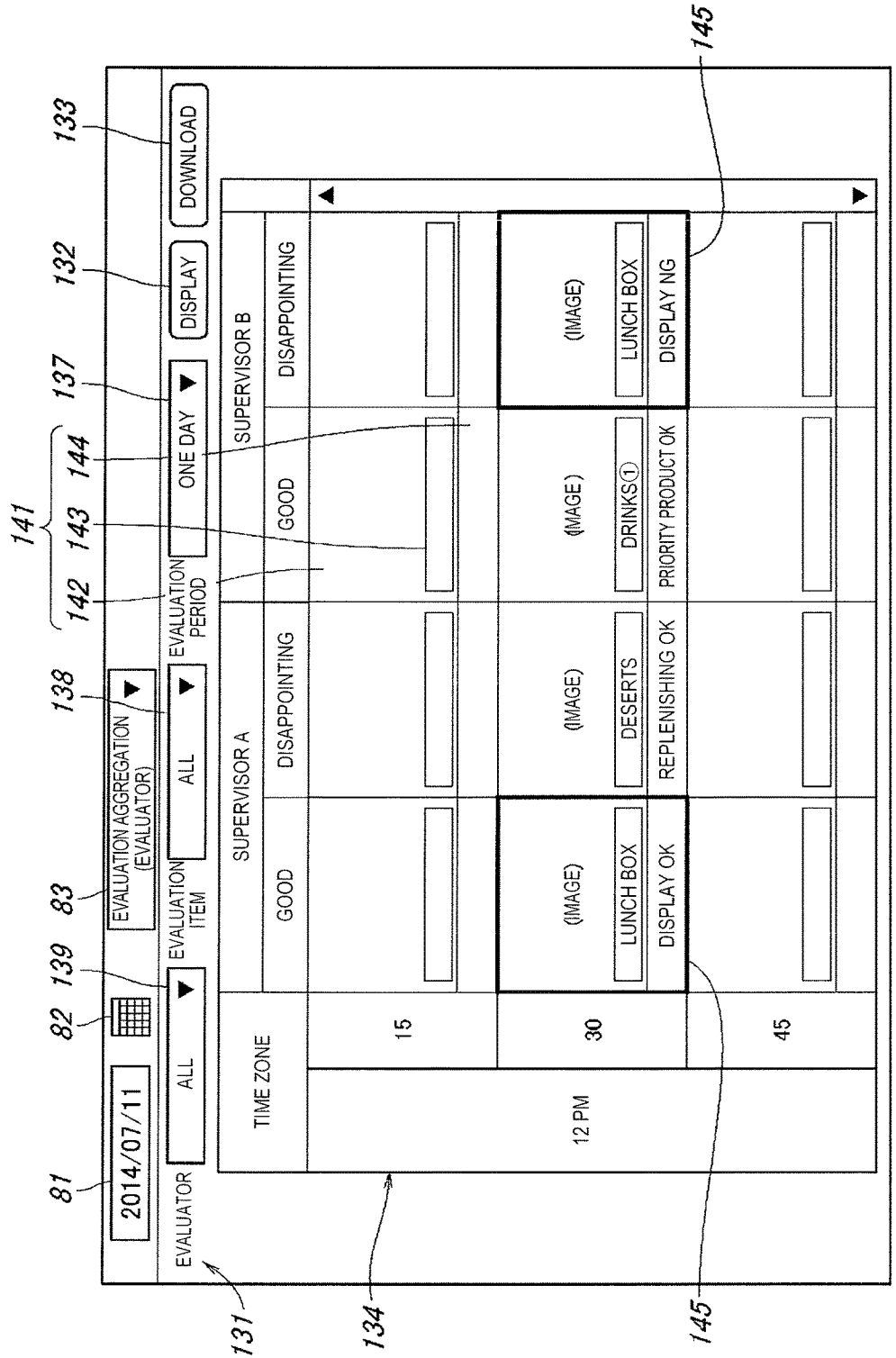
FIG. 15 is an explanatory diagram illustrating an evaluation result list screen displayed on monitor 5 of the store.
Figure 18:
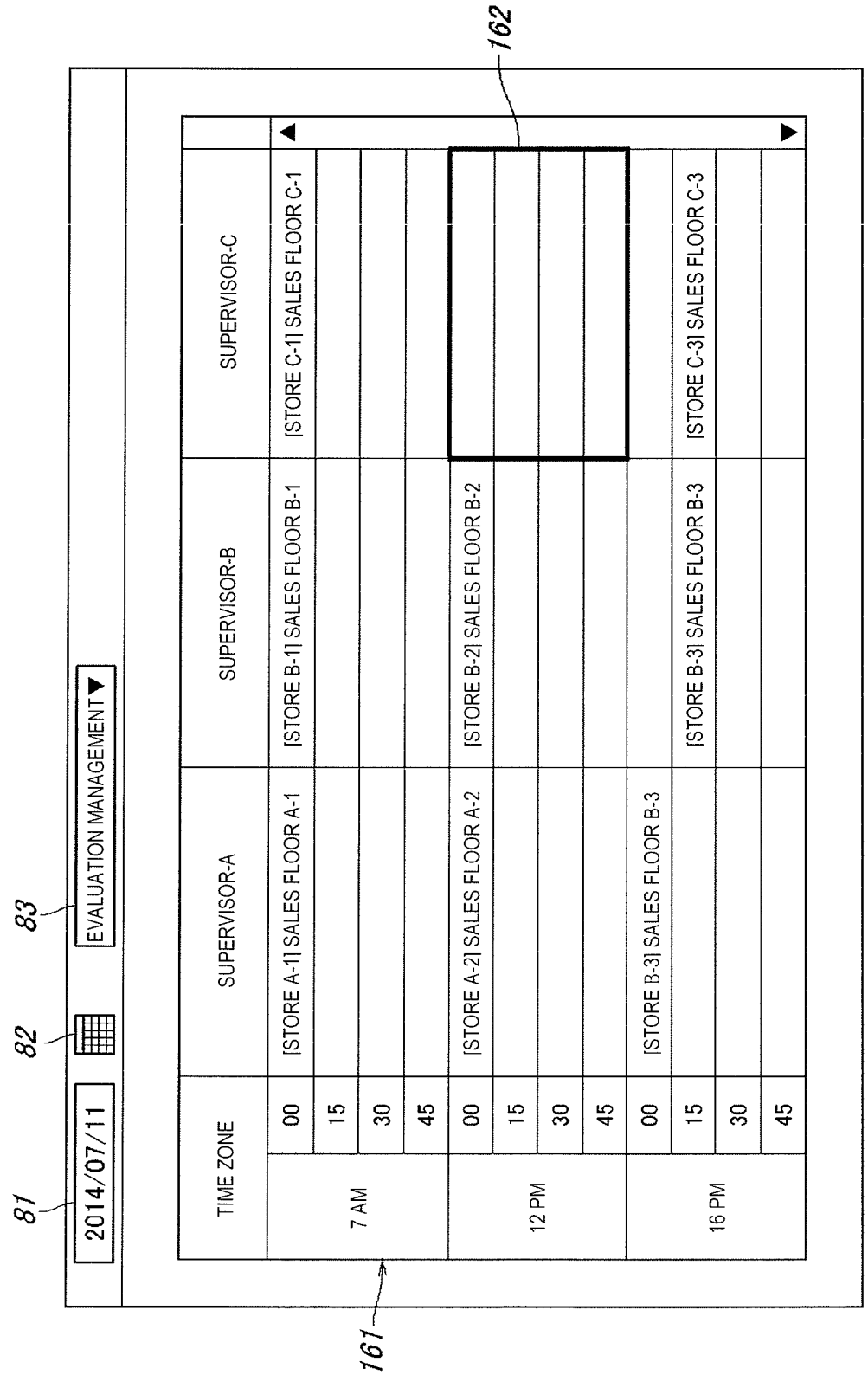
FIG. 18 is an explanatory diagram illustrating an evaluation management screen displayed on monitor 15 of the head office.

If the store monitoring is selected, a store monitoring screen illustrated in FIG. 8 is displayed. If the sales floor monitoring is selected, a sales floor monitoring screen illustrated in FIG. 10 is displayed. If the evaluation aggregation by evaluation result is selected, an evaluation result list screen illustrated in FIG. 13 is displayed. If the evaluation aggregation by evaluation item is selected, an evaluation result list screen illustrated in FIG. 14 is displayed. If the evaluation aggregation by evaluator is selected, an evaluation result list screen illustrated in FIG. 15 is displayed. If the evaluation management is selected, evaluation management screen 161 illustrated in FIG. 18 is displayed.

As shown in FIG. 8, tab 88 for each store is provided in store selection portion 84. By selecting and operating tab 88, the statistical information and image of the selected store are displayed in statistical Information display portion 85 and image display portion 86.

A time chart indicating temporal transition of the number of visitors and the number of store accounting customers is displayed in statistical information display portion 85. In the time chart, the number of visitors and the number of store accounting customers are represented by a line graph, the horizontal axis is time and the vertical axis is the number of people. In the present exemplary embodiment, as shown in FIG. 4, statistical information generator 36 executes a process of generating statistical information from the measurement value (the number of visitors and the number of store accounting customers) acquired by measurement unit 34, and statistical information presenter 51 executes a process of generating a time chart based on the statistical information generated by statistical information generator 36, and the time chart is displayed in statistical information display portion 85 illustrated in FIG. 8.

In statistical information display portion 85, characters 89 of the time zone (0 o'clock to 23 o'clock) are displayed along the time axis which is the horizontal axis of the time chart. Character 89 of a time zone is a selection point for designating the display time of an image to be displayed in image display portion 86. If an operation (click) of selecting any one of characters 89 of time zones is performed, the image of the selected time zone is displayed in image display portion 86. In statistical information display portion 85, line 93 representing the display time of the image is displayed.

In statistical information display portion 85, image 94 representing the time zone which is determined to be attentive for the entire store by attention time zone determinator 35 (see FIG. 4) is displayed by being superimposed at the corresponding position on the time chart. In the example shown in FIG. 8, image 94 representing the time zone which is determined to be attentive is displayed in each time zone of 5 o'clock, 13 o'clock, and 20 o'clock. The user can preferentially select character 89 of a time zone corresponding to the time zone which is determined to be attentive, by using image 94.

Character 89 of a time zone corresponding to the attention time zone may be displayed in a different display form from character 89 of the other time zone, and may be highlighted by changing, for example, the color, the thickness, the size, or the like.

The image of the interior of the store captured by camera 1 is displayed as a moving image, in image display portion 86. In image display portion 86, sales floor image display portion 91 displaying an image of a sales floor is provided for each sales floor, and sales floor name display portion 92 is displayed by being superimposed on the image of the sales floor in each sales floor image display portion 91. The image of sales floor image display portion 91 is displayed in response to the operation of selecting character (selection point) 89 of a time zone in the statistical information display portion 85. If the operation (click) of selecting character 89 of a time zone is performed, the image of each sales floor of the selected time zone is displayed in sales floor image display portion 91.

Time display portion 95, first and second skip buttons 96, 97, and first and second inverse skip button 98, 99 are provided in image operation unit 87. First and second skip buttons 96, 97 have different skip intervals. When for example, first skip button 96 is operated, the image skips to the image after fifteen minutes and when second skip button 97 is operated, the image skips to the image after one hour. First and second inverse skip buttons 98, 99 also have different skip intervals. When for example, first inverse skip button 98 is operated, the image skips to the image before fifteen minutes and when second inverse skip button 99 is operated, the image skips to the image before one hour.

Next, a sales floor monitoring screen for the user to recognize the situation of an opportunity loss in the sales floor will be described. FIG. 10 is an explanatory diagram illustrating a sales floor monitoring screen displayed on monitors 15, 5 illustrated in FIG. 4. Although FIG. 10 shows the situation on the designated date in the past, it is also possible to display the today's situation in real time, and in this case the situation before the current time is displayed.

Date display portion 81, date selection portion 82, display mode selection portion 83, store and sales floor display portion 101, statistical information display portion 102, image display portion 103, and image operation unit 87 are provided on the sales floor monitoring screen.

Date display portion 81, date selection portion 82, display mode selection portion 83, and image operation unit 87 are the same as in the store monitoring screen illustrated in FIG. 8. The names of the selected store and sales floor are displayed in store and sales floor display portion 101. In store and sales floor display portion 101, a sales floor list is displayed by operating (clicking) the name of the sales floor, and it is possible to select the sales floor which is desired to be displayed in the sales floor list.

A time chart indicating temporal transition of the number of sales floor accounting customers, the number of sales floor staying customers, and the number of visitors is displayed in statistical information display portion 102. In the time chart, the number of sales floor accounting customers, the number of sales floor staying customers, and the number of visitors are represented by a line graph, the horizontal axis is time, and the vertical axis is the number of people. In the present exemplary embodiment, as shown in FIG. 4, statistical information generator 36 executes a process of generating statistical information from the measurement value (the number of sales floor accounting customers, the number of sales floor staying customers, and the number of visitors) acquired by measurement unit 34, and statistical information presenter 51 executes a process of generating a time chart based on the statistical information generated by statistical information generator 36, and the time chart is displayed in statistical information display portion 102 illustrated in FIG. 10.

In statistical information display portion 102, similar to the store monitoring screen shown in FIG. 8, character 89 of a time zone is displayed along the time axis of the time chart, and characters 89 of a time zone is a selection point for designating the display time of the image to be displayed in image display portion 86. In statistical information display portion 102, line 93 representing the time of the image is displayed.

In statistical information display portion 102, image 94 representing the time zone which is determined to be attentive on a per sales floor basis by attention time zone determinator 35 (see FIG. 4) is displayed by being superimposed at the corresponding position on the time chart. In the example shown in FIG. 10, image 94 represents attention time zones, in each time zone of 8 o'clock, 15 o'clock, and 18 o'clock.

The image of the interior of the sales floor captured by camera 1 is displayed as a moving image, in image display portion 103. A plurality of sales floor image display portions 105 displaying images of sales floors are provided in image display portion 103. Images of respective times at a predetermined interval (for example, for 15 minutes) in one time zone (one hour) are displayed in plurality of sales floor image display portions 105. Time display portion 106 for displaying the display time of the image is displayed by being superimposed on the image of the sales floor in each sales floor image display portion 105.

On the store monitoring screen shown in FIG. 8 and the sales floor monitoring screen shown in FIG. 10, when displaying a moving image in sales floor image display portions 91, 105, a still image at the start time of the selected time zone is displayed in the initial state, and if an operation (click) of selecting sales floor image display portions 91, 105, the playback of the moving image may be started. Although the moving image may be played in sales floor image display portions 91, 105, a moving image playback screen may be displayed in a pop-up.

Figure 11:
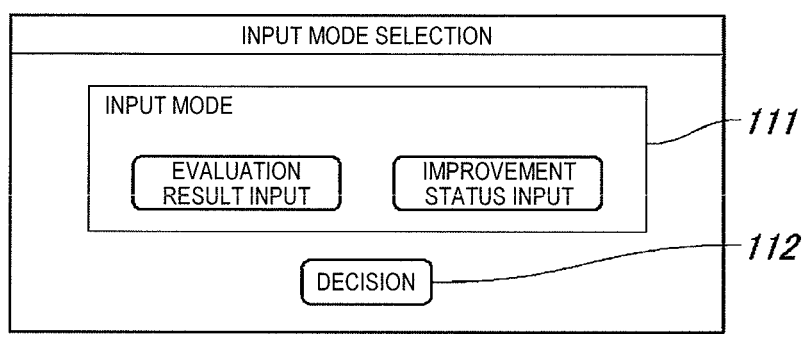
FIG. 11 is an explanatory diagram illustrating an input mode selection screen displayed on monitors 15, 5.
Figure 12A:
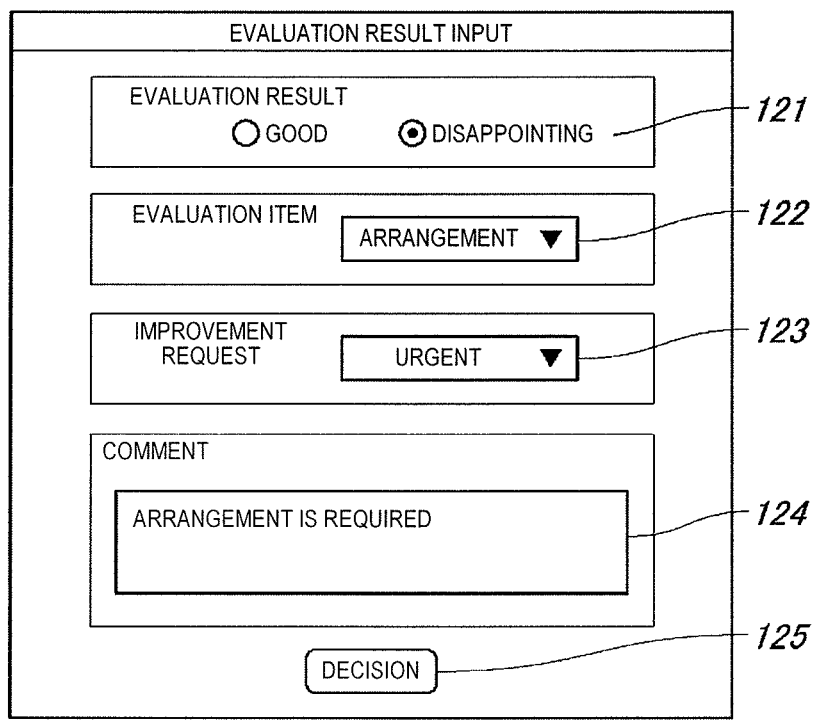
FIG. 12A is an explanatory diagram illustrating an evaluation result input screen displayed on monitor 15 of a head office.

Next, an evaluation result input screen for the supervisor to input an evaluation result will be described. FIG. 11 is an explanatory diagram illustrating an input mode selection screen displayed on monitors 15, 5 shown in FIG. 4. FIGS. 12A, B, and C are explanatory diagrams illustrating an evaluation result input screen displayed on monitor 15 of a head office illustrated in FIG. 4.

If sales floor name display portion 92 in image display portion 86 on store monitoring screen shown in FIG. 8 is operated (clicked), or time display portion 106 in image display portion 103 on sales floor monitoring screen shown in FIG. 10 is operated (clicked), an input mode selection screen shown in FIG. 11 is displayed in a pop-up.

Input mode selection screen is used for the user to select an input mode, and the input mode selection screen includes input mode selection portion 111 and decision button 112. In input mode selection portion 111, it is possible to select any one input modes of an evaluation result input and an improvement situation input. Here, when the evaluation result input mode is selected and decision button 112 is operated, an evaluation result input screen shown in FIG. 12A is displayed in a pop-up.

The evaluation result input screen is used for the supervisor to input a result of an evaluation performed on the store, the evaluation result input screen includes evaluation result selection portion 121, evaluation item selection portion 122, improvement request selection portion 123, comment input portion 124, and decision button 125.

In evaluation result selection portion 121, the supervisor selects a result of an evaluation performed on each sales floor of the store. Here, it is possible to select either "good" or "disappointing" by a radio button. Here, in a case where there is no deficiency in the sales floor which is an evaluation target, "good" is selected. In a case where there is a deficiency, "disappointing" is selected.

Figure 12B:
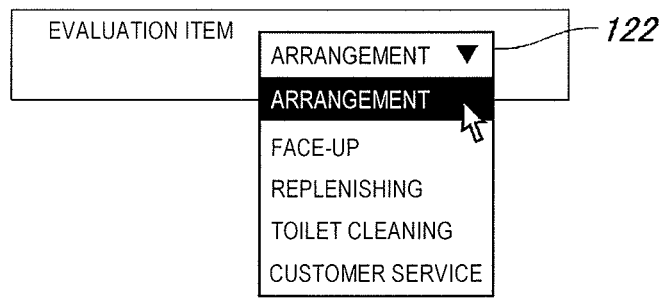
FIG. 12B is an explanatory diagram illustrating an evaluation result input screen displayed on monitor 15 of the head office.

In evaluation item selection portion 122, the supervisor selects an evaluation item that is the type (content) of evaluation performed on each sales floor of store. Here, as shown in FIG. 12B, it is possible to select any one of arrangement, face-up, replenishing, toilet cleaning, and customer service, in a pull-down menu.

Figure 12C:
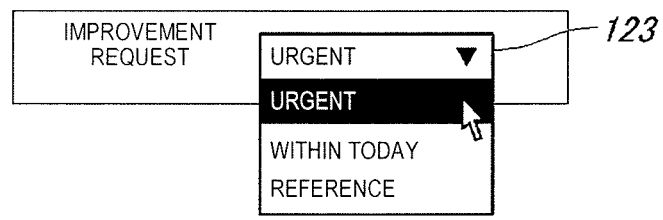
FIG. 12C is an explanatory diagram illustrating an evaluation result input screen displayed on monitors 15 of the head office.

In improvement request selection portion 123, in a case where "disappointing" is selected in evaluation result selection portion 121, that is, in a case where there is a deficiency in the sales floor which is the evaluation target, the supervisor selects a request for implementation of an improvement measure, depending on the degree of urgency of the improvement measure for the deficiency. Here, as shown in FIG. 12C, it is possible to select any one of "urgent", "within today", and "reference", in a pull-down menu. Here, in a case where the urgency of the improvement measure is high and instantaneous response is required, "urgent" is selected. In a case where the urgency of the improvement measure is low and response may be required within today, "within today" is selected. In a case where there is no urgency of the improvement measure and it is necessary to call the store manager attention, "reference" is selected.

In comment input portion 124, the supervisor inputs a comment such as a sentence that points out the deficiency of the sales floor and a sentence for communicating with the store manager.

When necessary operations are performed on evaluation result selection portion 121, evaluation item selection portion 122, improvement request selection portion 123, and comment input portion 124, and decision button 125 is operated, individual evaluation information acquirer 53 (see FIG. 4) executes a process for acquiring individual evaluation information on the evaluation result of the sales floor which is an evaluation object, based on the entered content.

Figure 16A:
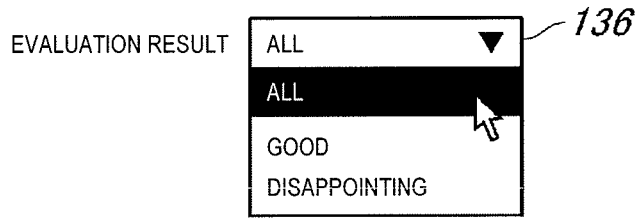
FIG. 16A is an explanatory diagram illustrating a main part of the evaluation result list screen.

Next, an evaluation result list screen in which the store manager checks the evaluation result input by the supervisor will be described. FIG. 13, FIG. 14, and FIG. 15 are explanatory diagrams illustrating an evaluation result list screen displayed on monitor 5 of the store shown in FIG. 4. FIG. 16A, B, C, and D are explanatory diagrams showing the essential parts of the evaluation result list screen shown in FIG. 13, FIG. 14, and FIG. 15.

In display mode selection portions 83 on the store monitoring screen shown in FIG. 8 and the sales floor monitoring screen shown in FIG. 10, as shown in FIG. 9, if the display modes of evaluation aggregation by evaluation result, evaluation aggregation by evaluation item, and evaluation aggregation by evaluator are respectively selected, evaluation result list screens shown in FIG. 13, FIG. 14, and FIG. 15 are displayed.

Aggregation condition setting portion 131, display button 132, download button 133, and evaluation result display portion 134 are provided on the evaluation result list screen shown in FIG. 13, FIG. 14, and FIG. 15.

Aggregation condition setting portion 131 varies depending on each display mode of the evaluation aggregation by evaluation result, the evaluation aggregation by evaluation item, and the evaluation aggregation by evaluator. As shown in FIG. 13, evaluation result selection portion 136 and aggregation period selection portion 137 are displayed in aggregation condition setting portion 131, on the evaluation result list screen to be displayed when the evaluation aggregation by evaluation result is selected. As shown in FIG. 14, evaluation item selection portion 138 and aggregation period selection portion 137 are displayed in aggregation condition setting portion 131, on the evaluation result list screen to be displayed when the evaluation aggregation by evaluation item is selected. As shown in FIG. 15, evaluator selection portion 139, evaluation item selection portion 138, and aggregation period selection portion 137 are displayed in aggregation condition setting portion 131, on the evaluation result list screen to be displayed when the evaluation aggregation by evaluator is selected.

Figure 16B:
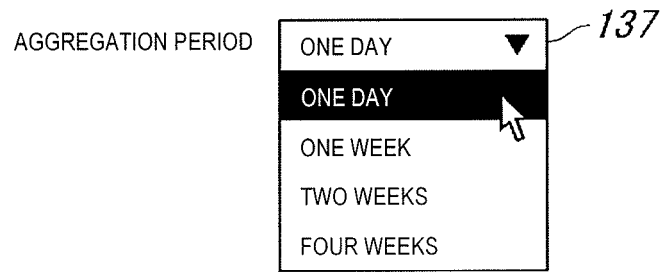
FIG. 16B is an explanatory diagram illustrating a main part of the evaluation result list screen.
Figure 16C:
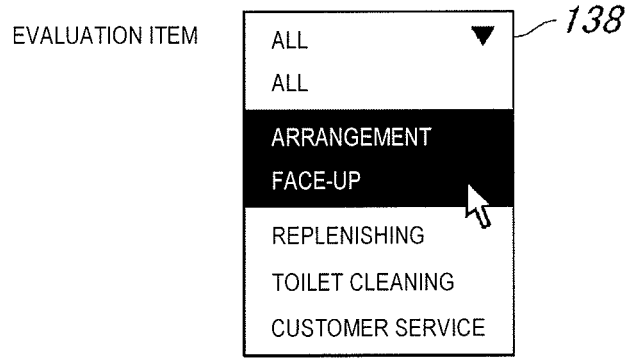
FIG. 16C is an explanatory diagram illustrating a main part of the evaluation result list screen.
Figure 16D:
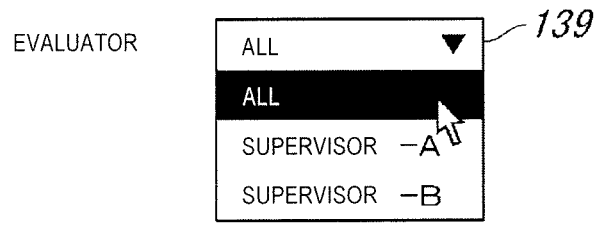
FIG. 16D is an explanatory diagram illustrating a main part of the evaluation result list screen.

As shown in FIG. 16A, it is possible to select any one of all, good, and disappointing, in a pull-down menu, in evaluation result selection portion 136. As shown in FIG. 16B, it is possible to select any one of one day, one week, two weeks, and four weeks, in a pull-down menu, in aggregation period selection portion 137. As shown in FIG. 16C, in evaluation item selection portion 138, it is possible to select all, arrangement, face-up, replenishing, toilet cleaning, and customer service in a pull-down menu, and a plurality of options other than all can be selected in duplicate. As shown in FIG. 16D, it is possible to select all or each person of supervisors in a pull down menu, in evaluator selection portion 139, and select a plurality of options other than all.

If the aggregation condition is selected in aggregation condition setting portion 131 and display button 132 is operated in this manner, evaluation aggregation information generator 39 (see FIG. 4) executes an aggregation process according to the selected aggregation condition, and the aggregation result is displayed in evaluation result display portion 134. If download button 133 is operated, download is executed to transmit a meta file of the aggregation result, for example, a comma-separated values (CSV) file from facility management server 11 to PC 3 in the store, and the aggregation result is acquired by PC 3 in the store. This allows users on the store side such as store manager to freely edit the aggregation result.

Evaluation results for each sales floor are listed on evaluation result display portion 134. In the examples shown in FIG. 13, FIG. 14, and FIG. 15, individual evaluation result display portion 141 displaying the evaluation result for each sales floor is displayed for each cell partitioned by a time zone (in this example, units of 15 minutes). Image display portion 142, sales floor name display portion 143, and comment display portion 144 are provided in individual evaluation result display portion 141. The image (still image) of the sales floor is displayed in image display portion 142, the name of the sales floor is displayed in sales floor name display portion 143, and the comment input by the supervisor is displayed in comment display portion 144, in individual evaluation result display portion 141 of a time zone when the supervisor inputs an evaluation result on the evaluation result input screen (see FIGS. 12A, B, and C).

As shown in FIG. 13, on the evaluation result list screen displaying the evaluation aggregation by evaluation result, individual evaluation result display portion 141 is displayed in the cell partitioned by good or defective (good or disappointing) evaluation, and as a result, the user on the store side can recognize the sales floor that receives a good evaluation and the sales floor that receives a defective evaluation, at a glance. As shown in FIG. 14, on the evaluation result list screen displaying the evaluation aggregation by evaluation item, individual evaluation result display portion 141 is displayed in the cell partitioned by an evaluation item and good or defective evaluation, and as a result, the user on the store side can recognize the difference between the evaluation results for respective evaluation items. As shown in FIG. 15, on the evaluation result list screen displaying the evaluation aggregation by evaluator, individual evaluation result display portion 141 is displayed in the cell partitioned by evaluator and good or defective evaluation, and as a result, it is possible to compare the evaluation results by the respective plurality of supervisors.

On the evaluation result list screens shown in FIG. 13, FIG. 14, and FIG. 15, individual evaluation result display portion 141 having a problem in the evaluation result is highlighted in order to draw attention of the user about the problematic evaluation result. In the examples shown in FIG. 13, FIG. 14, and FIG. 15, frame image 145 is displayed in individual evaluation result display portion 141. The discrimination may be enhanced by thick lines or coloring of red or the like in frame image 145.

In particular, on the evaluation result list screen displaying the evaluation aggregation by evaluation result as shown in FIG. 13, and the evaluation result list screen that displays the evaluation aggregation by evaluation item as shown in FIG. 14, in a case where the evaluation result is "disappointing" in a time zone that is determined to be attentive based on the store gap and the sales floor gap, frame image 145 is displayed on individual evaluation result display portion 141 which displays the evaluation result.

On the other hand, as shown in FIG. 15, on the evaluation result list screen displaying the evaluation aggregation by evaluator, in a case where the evaluations of the supervisors are different for the same sales floor in the same time zone, frame image 145 is displayed in individual evaluation result display portion 141 displaying the evaluation results. In the example shown in FIG. 15, since evaluations of supervisors A and B are different in the sales floor of lunch box, frame image 145 is displayed in individual evaluation result display portion 141. At this time, the user on the store side can recognize the difference between the evaluation criteria of the supervisors, when viewing the image of the sales floor displayed in image display portion 142.

The examples shown in FIG. 13, FIG. 14, and FIG. 15 indicate the case where one day is selected as the aggregation period, and individual evaluation result display portion 141 is displayed in the cell partitioned by a time zone (units of 15 minutes), but if one week, two weeks, and four weeks are selected as the aggregation period, individual evaluation result display portion 141 is displayed in the cell partitioned by one day. In this case, if a plurality of evaluations are made in one day, a plurality of individual evaluation result display portions 141 are displayed in the cell of one day.

Figure 17:
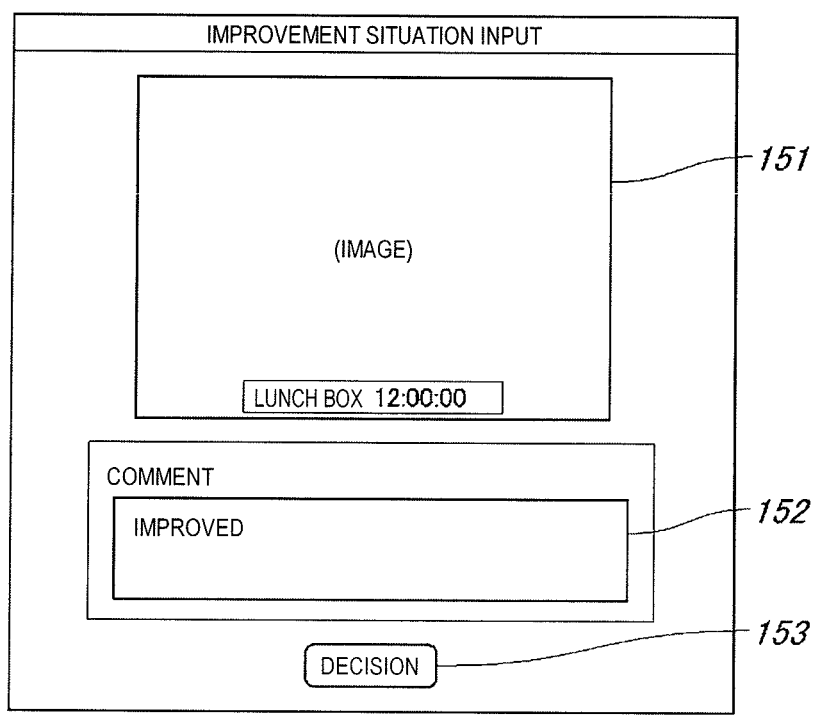
FIG. 17 is an explanatory diagram illustrating an improvement situation input screen displayed on monitor 5 of the store.

Next, an improvement situation input screen in which the store manager inputs the implementation situation of an improvement measure in PC 3 in the store will be described. FIG. 17 is an explanatory diagram illustrating an improvement situation input screen displayed on monitor 5 of the store shown in FIG. 4.

The store manager recognizes the deficiencies of a sales floor from the evaluation result list screen shown in FIG. 13, instructs the store clerk to perform improvement measures to improve the deficiencies. If the deficiency of the sales floor is resolved, the store manager inputs the implementation situation of the improvement measures in PC 3 in the store. At this time, as in the case of the evaluation result input screens shown in FIGS. 12A, B and C, when sales floor and time are selected on the monitoring screen shown in FIG. 8 and FIG. 10, the input mode selection screen shown in FIG. 11 is displayed as a popup, and when improvement situation input mode is selected on the input mode selection screen, the improvement situation input screen shown in FIG. 17 is displayed in a popup.

Image display portion 151, comment input portion 152, and decision button 153 are provided on the improvement situation input screen. The image of a sales floor showing situation where the deficiency has been improved is displayed in image display portion 151. The supervisor inputs a comment such as a sentence reporting that the deficiency is improved and a sentence for communicating with the supervisor, in comment input portion 152. If a comment is input in comment input portion 152 and decision button 153 is operated, upload is performed to transmit the name of the sales floor, the image of the sales floor, and a comment from PC 3 in the store to facility management server 11.

Here, on the monitoring screens shown in FIG. 8 and FIG. 10, if a sales floor on which an improvement measure is implemented and a time immediately after the improvement measure is implemented is selected, the image of the selected sales floor and time, that is, an image showing a situation where the deficiency has been improved by the improvement measure is displayed in image display portion 151 of improvement situation input screen.

The sales floor immediately after the improvement measure is implemented is captured by using a portable terminal such as a smartphone or a portable camera, and the image is acquired by PC 3, and the image may be displayed in image display portion 151 of improvement situation input screen. In this case, for example, if image display portion 151 is operated, a file selection screen is displayed, and a file storing the image of sales floor may be selected in the file selection screen.

In the present exemplary embodiment, an improvement report screen displaying the contents input on the improvement situation input screen shown in FIG. 17 in PC 3 in the store is displayed in PC 12 in the head office. The supervisor views the improvement report screen, and is able to check that the deficiency in the sales floor has been improved. The improvement report screen displayed in PC 12 in the head office is not particularly shown, but is the same as the improvement situation input screen shown in FIG. 17.

Next, the evaluation management screen for managing the evaluation work of the supervisor will be described. FIG. 18 is an explanatory diagram illustrating evaluation management screen 161 displayed on monitor 15 of the head office shown in FIG. 4.

In the present exemplary embodiment, as shown in FIG. 4, individual evaluation information acquirer 53 executes a process of acquiring individual evaluation information on the evaluation result about each sales floor of the store, in response to an input operation by the supervisor performed on the evaluation result input screen (see FIGS. 12A, B, and C), evaluation management information generator 40 executes a process of generating evaluation management information on the implementation situation of an evaluation work by each supervisor, based on the individual evaluation information acquired by individual evaluation information acquirer 53, and evaluation management information presenter 57 executes a process of generating evaluation management screen 161 shown in FIG. 18, based on the evaluation management information generated by evaluation management information generator 40 and displaying it on monitor 15.

The implementation situation of an evaluation work by each of a plurality of supervisors is displayed on evaluation management screen 161. In the example shown in FIG. 18, the name of the store and the name of sales floor for which the evaluation result is input by the supervisor on the evaluation result input screen (see FIGS. 12A, B, and C) is displayed, in the cell partitioned by a time zone (units of 15 minutes).

Each supervisor has a work schedule such that the evaluation work is performed in a predetermined time zone for each store that the supervisor is in charge of, and the head office manager who manages the evaluation work of the supervisor views evaluation management screen 161, it is possible to recognize whether or not each supervisor properly performs the evaluation work according to the work schedule.

On evaluation management screen 161, in a case where the supervisor does not input the evaluation result in the time zone defined in the work schedule, the cell of the time zone is highlighted. In particular here, frame image 162 is displayed in the cell of the corresponding time zone. The discrimination may be enhanced by thick lines or coloring of red or the like in frame image 162. In the example shown in FIG. 18, it is set that the evaluation work is to be performed in respective time zones of 7 o'clock in the morning, 12 o'clock in the afternoon, and 16 o'clock in the evening. Since the supervisor C does not input the evaluation result at the time zone of 12 o'clock in the afternoon, frame image 162 is displayed in the cell of the time zone.

In this manner, since the implementation situation of an evaluation work for each of the plurality of supervisors is displayed on evaluation management screen 161, the head office manager can recognize whether or not each supervisor properly performs the evaluation work. Particularly, the head office manager can immediately recognize that the supervisor does not perform the evaluation work according to the work schedule, from frame image 162 displayed on evaluation management screen 161.

As described above, in the present exemplary embodiment, the image extractor extracts an image of a target area in the facility, from a captured image of the interior of the facility, the image presenter presents the image of the target area to a user (first user) on a head office side such as a supervisor, the individual evaluation information acquirer acquires individual evaluation information on an evaluation result of the target area, in response to an operation of inputting the evaluation result about the presence or absence of deficiency in the target area, by the first user who views the image of the target area by the user on the head office side who view the image of the target area, the evaluation aggregation information generator aggregates the individual evaluation information in a designated period, and generates evaluation aggregation information for listing an evaluation result for the designated period, the evaluation aggregation information presenter presents the evaluation aggregation information to a user (second user) on the store side such as a store manage, the improvement implementation information acquirer acquires improvement implementation information on the implementation situation of the improvement measure, in response to an operation of inputting the implementation situation of the improvement measure that has been implemented in the target area having deficiency, by the user on the store side who views the evaluation aggregation information, and the improvement implementation information presenter presents the improvement implementation information to the user on the head office side. Thus, the user on the head office side and the user on the store side share information on evaluation for a store and information on an improvement measure implemented at the store according to the evaluation and try to communicate, thereby rationally performing a facility management work.

In the present exemplary embodiment, first quantity acquirer 73 acquires a first quantity (for example, the number of visitors) associated with customers who are expected to purchase products in the store, that is, customers visiting the store, second quantity acquirer 74 acquires a second quantity (for example, the number of store accounting customers) associated with customers who actually purchase products in the store, statistical information generator 36 generates statistical information indicating temporal transition of the first quantity and the second quantity, statistical information presenter 51 presents the statistical information to the user (first user) on the head office such as supervisors, and image extractor 37 extracts, in response to an operation of selecting a selection point on a time axis of the statistical information by the user on the head office side who views the statistical information, an image of the target area corresponding to the selected selection point. Therefore, the user on the head office side can recognize the situation of an opportunity loss at the facility, from the statistical information. The user on the head office side can specifically check the situation of an opportunity loss, from the image of the target area. The image of the selection point considered to be problematic due to the statistical information is quickly displayed, and while the statistical information and the image are compared, it is possible to check the situation of an opportunity loss. Therefore, the user on the head office side can recognize appropriately and quickly the situation of an opportunity loss at the facility.

In the present exemplary embodiment, attention time zone determinator 35 determines the necessity of attention for each time zone, based on the first quantity and the second quantity to determine an attention time zone, and statistical information presenter selectably and preferentially displays the selection point corresponding to the attention time zone. Thus, the image of the attention time zone is quickly displayed, thereby allowing the user (first user) on the head office side such as a supervisor to efficiently perform a work of specifically checking the situation of an opportunity loss from the image.

In the present exemplary embodiment, first quantity acquirer 73 acquires the number of customers visiting the store, as the first quantity, based on a captured image of the interior of the store, and second quantity acquirer 74 acquires sales information from a sales information management device that manages the sales information, and acquires the number of customers actually purchasing products in the entire store, as the second quantity, based on the sales information. This allows the user (first user) on the head office side such as supervisor to recognize the situation of an opportunity loss in the entire store.

In the present exemplary embodiment, individual evaluation information acquirer 53 acquires individual evaluation information for each of a plurality of supervisors in response to an input operation by the plurality of supervisors (first user), and evaluation aggregation information generator 39 generates evaluation aggregation information listing evaluation results for the respective plurality of supervisors. Therefore, the user (second user) on the store side such as the store manager can recognize the difference between the evaluation criteria of respective plurality of supervisors, by comparing the evaluation results by the respective plurality of supervisors.

In the present exemplary embodiment, evaluation aggregation information presenter 54 presents the evaluation result corresponding to the attention time zone so as to be distinguishable from another evaluation result. Therefore, the user on the store side such as a store manager (second user) can quickly check the evaluation result corresponding to the attention time zone, that is, the time zone in which an opportunity loss is assumed to occur.

In the present exemplary embodiment, evaluation aggregation information presenter 54 adds the image of the target area which is associated with the evaluation result of the target area to the evaluation aggregation information, and presents it to the user (second user) on the store side such as a store manager. Thus, since the evaluation result of the target area and the image of the target area are presented to the user on the store side, the user on the store side can easily and specifically recognize the evaluation content of the target area. The store manager can accurately and specifically give an instruction to the store clerk based on the image of the target area.

(Second Exemplary Embodiment)

Figure 19:
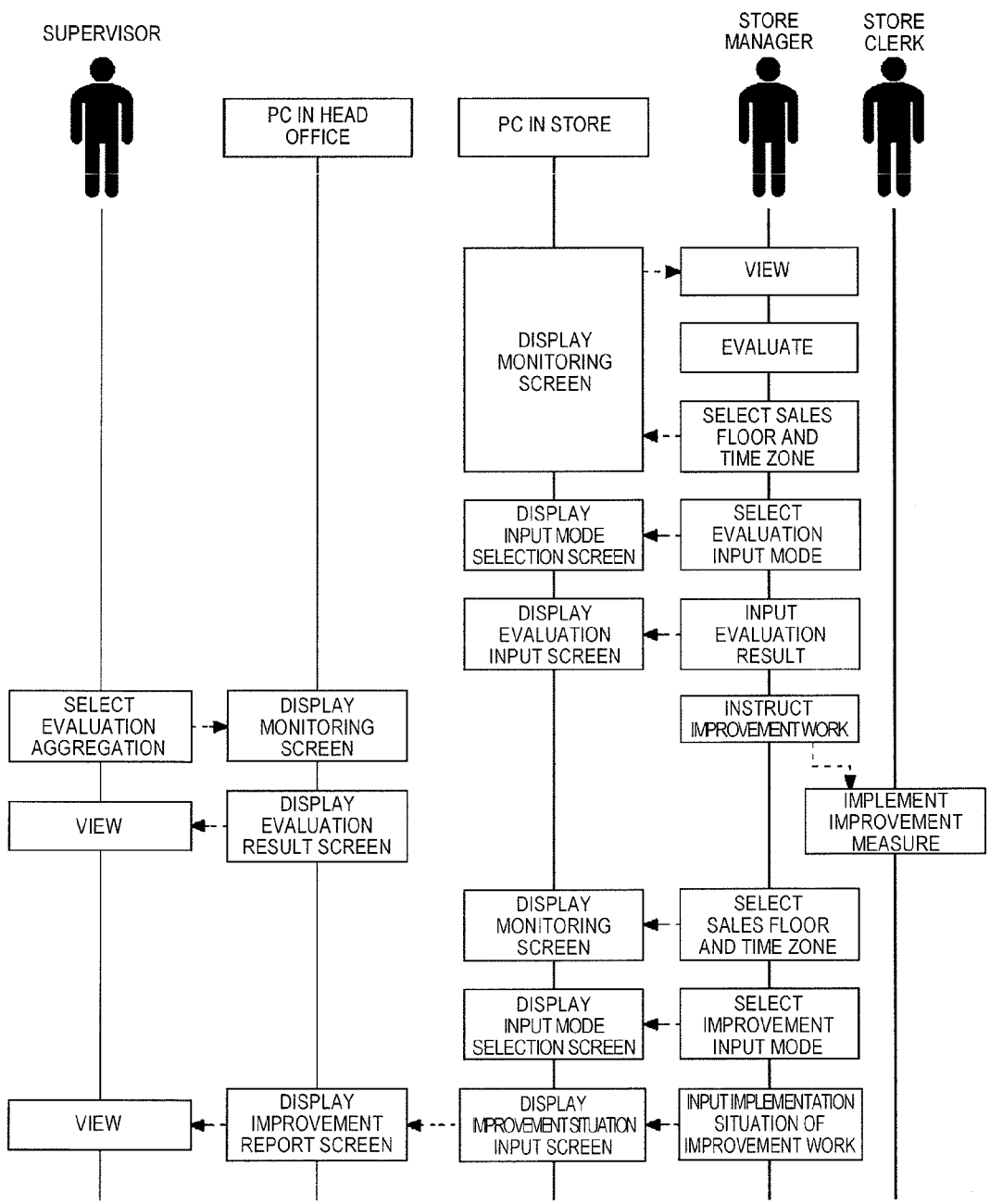
FIG. 19 is a sequence diagram showing an outline of a process executed by PC 12 in the head office and PC 3 in the store, and actions performed by a supervisor, a store manager, and a store clerk, in a second exemplary embodiment.

Next, a second exemplary embodiment will be described. It is to be noted that those not specifically mentioned here are the same as in the first exemplary embodiment. FIG. 19 is a sequence diagram showing an outline of a process executed by PC 12 in the head office and PC 3 in the store, and actions performed by a supervisor, a store manager, and a store clerk, in a second exemplary embodiment.

In the first exemplary embodiment, the supervisor evaluates each sales floor of the store that the supervisor is in charge of, and presents the evaluation result to the store manager, but in the second exemplary embodiment, the store manage evaluates each sales floor of the store that the store manager is in charge of, and presents the evaluation result to the supervisor. The store manager instructs the store clerk to perform a necessary improvement measure, based on the evaluation performed by the store manager. If the store clerk performs the improvement measure and the deficiency is resolved, similar to the first exemplary embodiment, the store manager notifies the supervisor of the implementation situation of an improvement measure. The supervisor views the report from the store manager, and can recognize that the deficiency in the store has been improved.

Since the second exemplary embodiment is almost the same as the first exemplary embodiment except that the screen display is switched between the head office and the store, and the screen operation is switched between the supervisor and the store manager, the detailed description of the procedure of the display on the screen and the screen operation will be omitted.

In the second exemplary embodiment, the result of the evaluation performed by the store manager is presented to the supervisor, but the evaluation result may not be presented to the supervisor. The second exemplary embodiment is not exclusively implemented with the first exemplary embodiment, but it can be implemented in combination with the first exemplary embodiment.

As described above, in the second exemplary embodiment, image extractor 37 extracts an image of the target area in the store from the captured image of the interior of the store, image presenter 52 presents the image of the target area to the user (first user) on the store side such as the store manager, improvement implementation information acquirer 55 acquires improvement implementation information on the implementation situation of an improvement measure, in response to an operation of inputting the implementation situation of the improvement measure that has been implemented in a target area having deficiency by the user on the store side who views the image of the target area, and improvement implementation information presenter 56 presents the improvement implementation information to the user (second user) on the head office side such as the supervisor. Therefore, the user on the store side and the user on the head office share information on an improvement measure implemented at the store and try to communicate, thereby rationally performing a facility management work.

Although the present disclosure has been described based on specific exemplary embodiments, these exemplary embodiments are merely examples, and the present disclosure is not limited by these exemplary embodiments. In addition, all the constituent elements of the facility management assistance device, the facility management assistance system, and the facility management assistance method according to the present disclosure described in the exemplary embodiments are not necessarily indispensable, and can be selected as appropriate at least without departing from the scope of the present disclosure.

For example, although the above-mentioned exemplary embodiments have been described about the example of a retail store such as a convenience store, the disclosure can be widely applied to various facilities that provide products and services to users, such as financial institutions such as banks, or accommodation facilities such as hotels, and is suitable for the case where it is difficult to communicate between the administrator of the facility and the instructor, such as the case where such facilities and the head office that controls it are located in remote areas and the instructor belonging to the head office is in charge of many facilities.

In the above-mentioned exemplary embodiment, customer detector 33 that performs person detection is provided in facility management server 11, but a person detection device can be provided separately from facility management server 11. It is also possible to integrate the person detection device into camera 1 to form a camera with a person detection function.

In the case of displaying and playing the captured image of the interior of the facility, a person such as a customer is captured, but the captured image may be displayed and played by applying a protection process such as deleting a person or changing a person area to a transmissive mask image from the viewpoint of privacy protection. The protection process may be performed on facility management server 11 side, but may be performed on camera 1 side. In this case, a part of the configuration components of facility management server 11 may be incorporated in such a manner that a protection processing unit and the configuration such as customer detection are integrated into camera 1.

In the above-mentioned exemplary embodiment, facility management server 11 provided in the head office may perform a process necessary for facility management assistance, but cloud computer 21 constituting a cloud computing system may perform the necessary process, as shown in FIG. 1. The required processes may be shared by a plurality of information processing devices, and information may be transferred between the plurality of information processing devices through a communication medium such as an IP network or a LAN. In this case, a facility management assistance system is configured with the plurality of information processing devices that share required processes.

With such a configuration, at least a process with a large computation amount, for example, a person detection process, among processes required for facility management assistance may be performed by a device such as PC 3 or camera 1 provided in the store. With this configuration, since the data amount of the information required for the remaining process is reduced, even if the remaining process is executed by an information processing device provided in a location different from the store, such as a head office, the communication load can be reduced, so that the operation of a system using a wide area network connection form becomes easy.

At least a process with a large computation amount, for example, a person detection process, among processes required for facility management assistance may be performed by cloud computer 21. With this configuration, since the data amount of the remaining process is reduced, a high-speed information processing device is not required on the user side such as head office and store, and the cost burdened by the user can be reduced.

In the present exemplary embodiment, facility management server 11 provided in the head office performs a process required for facility management assistance and PC 12 provided in the head office and PC 3 provided in the store performs necessary input and output, but a portable terminal such as smartphone 22 or tablet terminal 23 may perform the necessary input and output. In particular, if a person in charge of the facility management work such as a supervisor owns a portable terminal such as tablet terminal 23 and the person in charge can perform view and input operations at an arbitrary place, convenience can be further enhanced.

INDUSTRIAL APPLICABILITY

The facility management assistance device, the facility management assistance system, and the facility management assistance method according to the present disclosure has an effect capable of rationally performing a facility management work, by information on evaluation for a facility and information on an improvement measure implemented at the facility according to the evaluation being shared among a plurality of persons concerned and the plurality of persons concerned try to communicate with each other, and is useful for a facility management assistance device, a facility management assistance system, and a facility management assistance method, which assist a work of a user who manages a facility that provides products or services to the user.

REFERENCE MARKS IN THE DRAWINGS

1 CAMERA
2 RECORDER
3 PC (USER TERMINAL)
4 POS TERMINAL (SALES INFORMATION MANAGEMENT DEVICE)
5 MONITOR (DISPLAY DEVICE)
6 INPUT DEVICE
11 FACILITY MANAGEMENT SERVER (FACILITY MANAGEMENT ASSISTANCE DEVICE)
12 PC (USER TERMINAL)
13 POS SERVER (SALES INFORMATION MANAGEMENT DEVICE)
15 MONITOR (DISPLAY DEVICE)
16 INPUT DEVICE
21 CLOUD COMPUTER
22 SMARTPHONE
23 TABLET TERMINAL
31 IMAGE ACQUIRER
32 SALES INFORMATION ACQUIRER
33 CUSTOMER DETECTOR
34 MEASUREMENT UNIT
35 ATTENTION TIME ZONE DETERMINATOR
36 STATISTICAL INFORMATION GENERATOR
37 IMAGE EXTRACTOR
38 EVALUATION INFORMATION STORAGE UNIT
39 EVALUATION AGGREGATION INFORMATION GENERATOR
40 EVALUATION MANAGEMENT INFORMATION GENERATOR
51 STATISTICAL INFORMATION PRESENTER
52 IMAGE PRESENTER
53 INDIVIDUAL EVALUATION INFORMATION ACQUIRER
54 EVALUATION AGGREGATION INFORMATION PRESENTER
55 IMPROVEMENT IMPLEMENTATION INFORMATION ACQUIRER
56 IMPROVEMENT IMPLEMENTATION INFORMATION PRESENTER
57 EVALUATION MANAGEMENT INFORMATION PRESENTER
71 VISITOR DETECTOR
72 SALES FLOOR STAYING CUSTOMER DETECTOR
73 FIRST QUANTITY ACQUIRER
74 SECOND QUANTITY ACQUIRER
75 VISITOR NUMBER ACQUIRER
76 SALES FLOOR STAYING CUSTOMER NUMBER ACQUIRER
77 STORE ACCOUNTING CUSTOMER NUMBER ACQUIRER
78 SALES FLOOR ACCOUNTING CUSTOMER NUMBER ACQUIRER
81 DATE DISPLAY PORTION
82 DATE SELECTION PORTION
83 DISPLAY MODE SELECTION PORTION
84 STORE SELECTION PORTION
85 STATISTICAL INFORMATION DISPLAY PORTION
86, 103 IMAGE DISPLAY PORTION
87 IMAGE OPERATION UNIT
88 TAB FOR EACH STORE
89 CHARACTER OF TIME ZONE
91, 105 SALES FLOOR IMAGE DISPLAY PORTION
92 SALES FLOOR NAME DISPLAY PORTION
93 LINE REPRESENTING TIME OF IMAGE
94 IMAGE REPRESENTING TIME ZONE DETERMINED TO BE ATTENTIVE
95, 106 TIME DISPLAY PORTION
96 FIRST SKIP BUTTON
97 SECOND SKIP BUTTON
98 FIRST INVERSE SKIP BUTTON
99 SECOND INVERSE SKIP BUTTON
101 STORE AND SALES FLOOR DISPLAY PORTION

102 STATISTICAL INFORMATION DISPLAY PORTION
111 INPUT MODE SELECTION PORTION
112, 125, 153 DECISION BUTTON
121, 136 EVALUATION RESULT SELECTION PORTION
122, 138 EVALUATION ITEM SELECTION PORTION
123 IMPROVEMENT REQUEST SELECTION PORTION
124, 152 COMMENT INPUT PORTION
131 AGGREGATION CONDITION SETTING PORTION
132 DISPLAY BUTTON
133 DOWNLOAD BUTTON
134 EVALUATION RESULT DISPLAY PORTION
137 AGGREGATION PERIOD SELECTION PORTION
139 EVALUATOR SELECTION PORTION
141 INDIVIDUAL EVALUATION RESULT DISPLAY PORTION
142, 151 IMAGE DISPLAY PORTION
143 SALES FLOOR NAME DISPLAY PORTION
144 COMMENT DISPLAY PORTION
145, 162 FRAME IMAGE
161 EVALUATION MANAGEMENT SCREEN
A1, A2-1, A2-2, A2-3, A2-4, A3, A4 TARGET AREA

The invention claimed is:

1. A facility management assistance device that assists a work of a user who manages a facility that provides products or services to the user, the facility management assistance device comprising:
   an image extractor that extracts an image of a sales floor of the facility, from a captured image of an interior of the facility;
   an image presenter that presents the image of the sales floor to a first client device;
   a first quantity acquirer that acquires a number of visitors on the sales floor of the facility;
   a second quantity acquirer that acquires a number of receipts issued in the facility;
   an attention time zone determinator that determines an attention time zone by dividing a preset time zone of a day into a plurality of measurement periods, calculating a gap between the number of visitors on the sales floor and the number of receipts issued in the facility for each of the plurality of measurement periods, incrementing a counter value for each of the plurality of measurement periods in which the gap exceeds a first threshold, and determining the preset time zone of the day to be the attention time zone when the counter value exceeds a second threshold;
   a statistical information presenter that presents the attention time zone to the first client device;
   an individual evaluation information acquirer that acquires individual evaluation information on an evaluation result of the sales floor, in response to a first input from the first client device, the evaluation result corresponding to the attention time zone;
   an evaluation aggregation information generator that aggregates the individual evaluation information acquired from the first client device in a designated period, and generates evaluation aggregation information for listing an evaluation result for the designated period;
   an evaluation aggregation information presenter that presents the evaluation aggregation information to a second client device, the second client device being different than the first client device;
   an improvement implementation information acquirer that acquires improvement implementation information on an improvement measure for the sales floor, in response to a second input from the second client device; and
   an improvement implementation information presenter that presents the improvement implementation information to the first client device.

2. The facility management assistance device according to claim 1,
   wherein the statistical information presenter selectably and preferentially displays, on the first client device, a selection point corresponding to the attention time zone.

3. The facility management assistance device according to claim 2,
   wherein the evaluation aggregation information presenter presents the evaluation result corresponding to the attention time zone so as to be distinguishable from another evaluation result.

4. The facility management assistance device according to claim 1,
   wherein the first quantity acquirer acquires the number of visitors visiting the facility based on the captured image of the interior of the facility, and
   wherein the second quantity acquirer acquires the number of receipts from a sales information management device that manages sales information.

5. The facility management assistance device according to claim 1,
   wherein the individual evaluation information acquirer acquires the individual evaluation information for each of a plurality of first users, in response to input operations by the plurality of first users, and
   wherein the evaluation aggregation information generator generates the evaluation aggregation information for listing evaluation results for the respective plurality of first users.

6. The facility management assistance device according to claim 1,
   wherein the evaluation aggregation information presenter adds the image of the sales floor which is associated with the evaluation result of the sales floor to the evaluation aggregation information, and presents the image to the second client device.

7. A facility management assistance device that assists a work of a user who manages a facility that provides products or services to the user, the facility management assistance device comprising:
   an image extractor that extracts an image of a sales floor of the facility, from a captured image of an interior of the facility;
   an image presenter that presents the image of the sales floor to a first client device;
   a first quantity acquirer that acquires a number of visitors on the sales floor of the facility;
   a second quantity acquirer that acquires a number of receipts issued in the facility;
   an attention time zone determinator that determines an attention time zone by dividing a preset time zone of a day into a plurality of measurement periods, calculating a gap between the number of visitors on the sales floor and the number of receipts issued in the facility for each of the plurality of measurement periods, incrementing a counter value for each of the plurality of measurement periods in which the gap exceeds a first threshold, and determining the preset time zone of the day to be the attention time zone when the counter value exceeds a second threshold;

a statistical information presenter that presents the attention time zone to the first client device;

an improvement implementation information acquirer that acquires improvement implementation information on an improvement measure for the sales floor, in response to an input from a second client device, the second client device being different than the first client device, the improvement measure corresponding to the attention time zone;

an improvement implementation information presenter that presents the improvement implementation information to the first client device.

8. A facility management assistance system that assists a work of a user who manages a facility that provides products or services to the user, the facility management assistance system comprising:

a camera that captures an interior of the facility; and a plurality of information processing devices, wherein any one of the plurality of information processing devices includes an image extractor that extracts an image of a sales floor of the facility, from a captured image of the interior of the facility;

an image presenter that presents the image of the sales floor to a first client device;

a first quantity acquirer that acquires a number of visitors on the sales floor of the facility;

a second quantity acquirer that acquires a number of receipts issued in the facility;

an attention time zone determinator that determines an attention time zone by dividing a preset time zone of a day into a plurality of measurement periods, calculating a gap between the number of visitors on the sales floor and the number of receipts issued in the facility for each of the plurality of measurement periods, incrementing a counter value for each of the plurality of measurement periods in which the gap exceeds a first threshold, and determining the preset time zone of the day to be the attention time zone when the counter value exceeds a second threshold;

a statistical information presenter that presents the attention time zone to the first client device;

an individual evaluation information acquirer that acquires individual evaluation information on an evaluation result of the sales floor, in response to a first input from the first client device, the evaluation result corresponding to the attention time zone;

an evaluation aggregation information generator that aggregates the individual evaluation information acquired from the first client device in a designated period, and generates evaluation aggregation information for listing an evaluation result for the designated period;

an evaluation aggregation information presenter that presents the evaluation aggregation information to a second client device, the second client device being different than the first client device;

an improvement implementation information acquirer that acquires improvement implementation information on an improvement measure for the sales floor, in response to a second input from the second client device;

an improvement implementation information presenter that presents the improvement implementation information to the first client device.

9. A facility management assistance method causing an information processing device to perform a process of assisting a work of a user who manages a facility that provides products or services to the user, the facility management assistance method comprising:

extracting an image of a sales floor of the facility, from a captured image of an interior of the facility;

presenting the image of the sales floor to a first client device;

acquiring a number of visitors on the sales floor of the facility;

acquiring a number of receipts issued in the facility;

determining an attention time zone by dividing a preset time zone of a day into a plurality of measurement periods, calculating a gap between the number of visitors on the sales floor and the number of receipts issued in the facility for each of the plurality of measurement periods, incrementing a counter value for each of the plurality of measurement periods in which the gap exceeds a first threshold, and determining the preset time zone of the day to be the attention time zone when the counter value exceeds a second threshold;

presenting the attention time zone to the first client device;

acquiring individual evaluation information on an evaluation result of the sales floor, in response to a first input from the first client device, the evaluation result corresponding to the attention time zone;

aggregating the individual evaluation information acquired from the first client device in a designated period, and generating evaluation aggregation information for listing an evaluation result for the designated period;

presenting the evaluation aggregation information to a second client device, the second client device being different than the first client device;

acquiring improvement implementation information on an improvement measure for the sales floor, in response to a second input from the second client device;

presenting the improvement implementation information to the first client device.

10. The facility management assistance device according to claim 1, wherein a processor comprises the image extractor, the image presenter, the individual evaluation information acquirer, the evaluation aggregation information generator, the evaluation aggregation information presenter, the improvement implementation information acquirer, the improvement implementation information presenter, the first quantity acquirer, the second quantity acquirer, the attention time zone determinator, and the statistical information presenter.

11. The facility management assistance device according to claim 7, wherein a processor comprises the image extractor, the image presenter, the improvement implementation information acquirer, the improvement implementation information presenter, the first quantity acquirer, the second quantity acquirer, the attention time zone determinator, and the statistical information presenter.

* * * * *